(12) United States Patent
Hauer et al.

(10) Patent No.: US 12,065,320 B2
(45) Date of Patent: Aug. 20, 2024

(54) TRANSPORT DEVICE

(71) Applicant: B&R INDUSTRIAL AUTOMATION GMBH, Eggelsberg (AT)

(72) Inventors: Michael Hauer, Eggelsberg (AT); Stefan Flixeder, Eggelsberg (AT); Martin Haudum, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 130 days.

(21) Appl. No.: 17/908,452

(22) PCT Filed: Mar. 3, 2021

(86) PCT No.: PCT/EP2021/055250
§ 371 (c)(1),
(2) Date: Aug. 31, 2022

(87) PCT Pub. No.: WO2021/175885
PCT Pub. Date: Sep. 10, 2021

(65) Prior Publication Data
US 2023/0097926 A1    Mar. 30, 2023

(30) Foreign Application Priority Data
Mar. 5, 2020  (AT) .............................. A 50168/2020

(51) Int. Cl.
*B65G 54/02*  (2006.01)
*H02K 41/02*  (2006.01)
*H02K 41/03*  (2006.01)

(52) U.S. Cl.
CPC ............. *B65G 54/02* (2013.01); *H02K 41/02* (2013.01); *H02K 41/031* (2013.01)

(58) Field of Classification Search
CPC ....... H02K 41/031; H02K 41/02; B65G 54/02
(Continued)

(56) References Cited

U.S. PATENT DOCUMENTS 3,720,172 A    3/1973 Dehne
5,014,864 A    5/1991 Richter et al.
(Continued)

FOREIGN PATENT DOCUMENTS

DE    195 12 073    11/1998
EP    0 338 100    10/1989
(Continued)

OTHER PUBLICATIONS

Jansen, "Magnetically levitated planar actuator with moving magnets: Electromechanical Analysis and Design," Eindhoven: Tech. Univ. of Eindhoven, DOI 10.6100/IR630846.

(Continued)

*Primary Examiner* — James R Bidwell
(74) *Attorney, Agent, or Firm* — GREENBLUM & BERNSTEIN, P.L.C.

(57) ABSTRACT

A transport device in the form of a planar motor having at least one transport segment which forms a transport plane and having at least one transport unit, which can be moved at least two-dimensionally in the transport plane, to allow more versatile process management, is provided in the transport device. At least one coupling apparatus for releasably coupling the transport unit to the coupling unit is arranged on the transport unit and, on the coupling unit in each case, the transport unit and the coupling unit can be coupled, at least temporarily, by the coupling apparatuses to form an assembly by way of a relative movement in the transport plane. The coupling apparatuses interact in the coupled assembly in order to limit a relative movement between the transport unit and the coupling unit in at least one degree of freedom of movement.

15 Claims, 11 Drawing Sheets

Figure 1A:
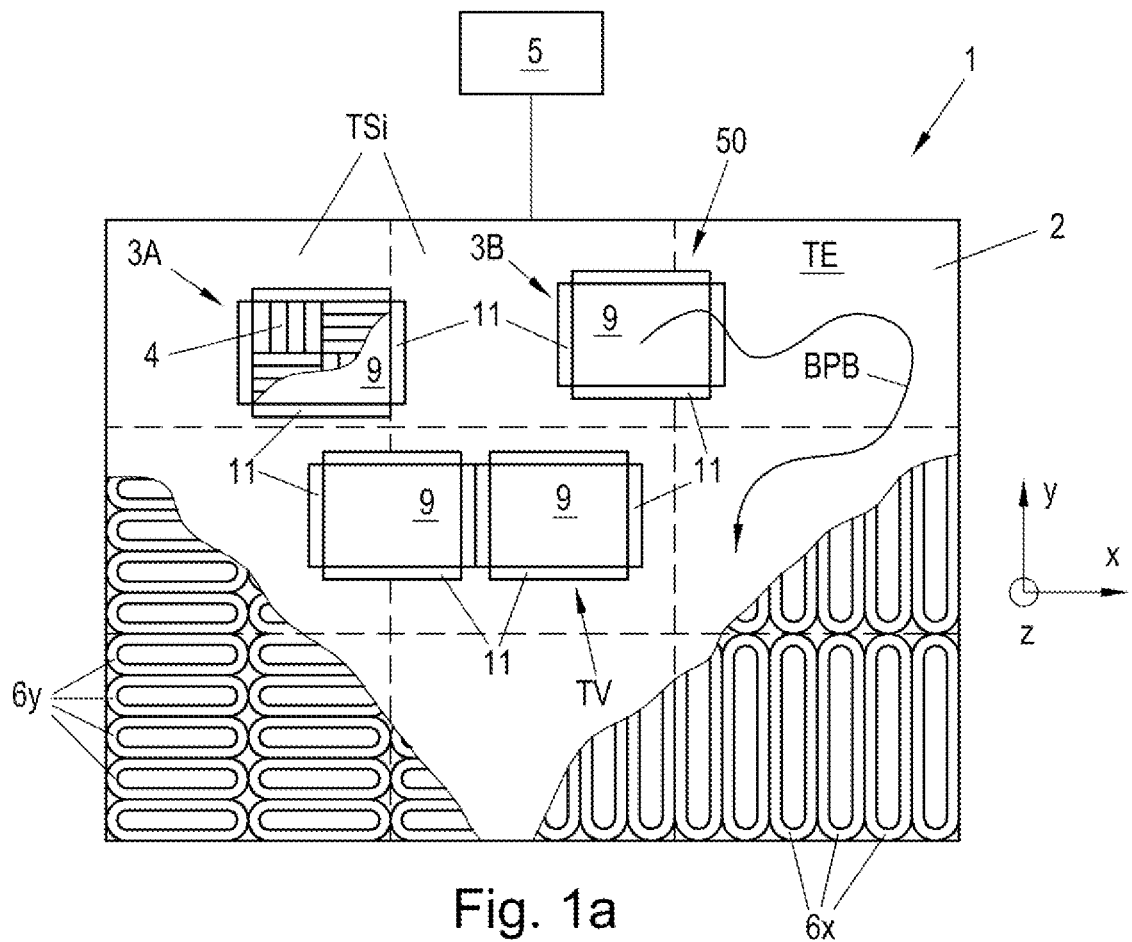

(58) Field of Classification Search
USPC .......................................................... 198/805
See application file for complete search history.

(56) References Cited

U.S. PATENT DOCUMENTS

| | | | | |
|---|---|---|---|---|
| 5,947,361 | A * | 9/1999 | Berger | B41F 13/03 |
| | | | | 226/110 |
| 6,246,204 | B1 * | 6/2001 | Ebihara | G03F 7/70358 |
| | | | | 318/566 |
| 7,857,297 | B2 * | 12/2010 | Ong | B65G 54/02 |
| | | | | 271/271 |
| 9,828,192 | B2 | 11/2017 | Baechle et al. | |
| 9,878,813 | B2 | 1/2018 | Eberhardt et al. | |
| 10,116,195 | B2 * | 10/2018 | Lu | H02N 15/00 |
| 10,167,143 | B2 | 1/2019 | Senn et al. | |
| 2015/0241794 | A1 * | 8/2015 | Yang | H02P 25/06 |
| | | | | 318/135 |
| 2017/0225911 | A1 | 8/2017 | Baechle et al. | |
| 2020/0030995 | A1 | 1/2020 | Lu et al. | |
| 2021/0155422 | A1 | 5/2021 | Kastinger et al. | |
| 2023/0174312 | A1 * | 6/2023 | Hauer | B65G 23/23 |
| | | | | 198/619 |

FOREIGN PATENT DOCUMENTS

| | | | | |
|---|---|---|---|---|
| EP | 3 172 134 | | 8/2018 | |
| EP | 3 172 156 | | 12/2018 | |
| GB | 1 330 372 | | 9/1973 | |
| WO | WO-2009054520 | A1 * | 4/2009 | ......... G03F 7/70341 |
| WO | 2015/036196 | | 3/2015 | |
| WO | 2016/012171 | | 1/2016 | |
| WO | 2018/176137 | | 10/2018 | |
| WO | 2019/243630 | | 12/2019 | |
| WO | WO-2021175882 | A1 * | 9/2021 | ............. B65G 23/23 |

OTHER PUBLICATIONS

Austria Office Action conducted in counterpart Austria Appln. No. A50168/2020 (Oct. 20, 2020).
Int'l Search Report (Form PCT/ISA/210) conducted in Int'l Appln. No. PCT/EP2021/055250 (May 14, 2021).
Int'l Written Opinion (Form PCT/ISA/237) conducted in Int'l Appln. No. PCT/EP2021/055250 (May 14, 2021).
Int'l Prelim. Exam. Report (Form PCT/ISA/409) conducted in Int'l Appln. No. PCT/EP2021/055250 (Aug. 10, 2022).

\* cited by examiner

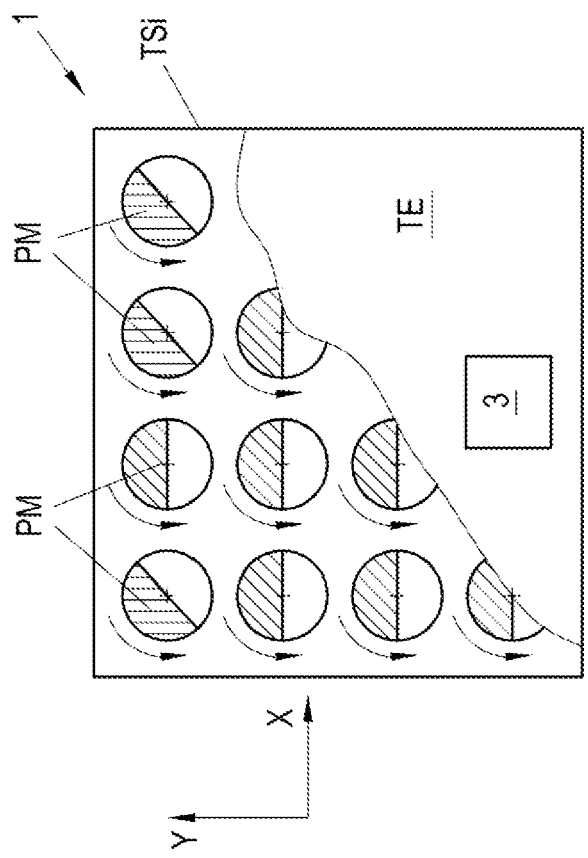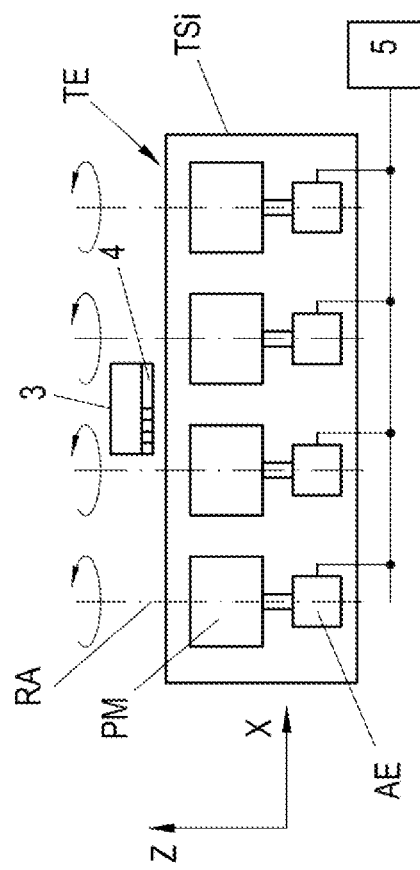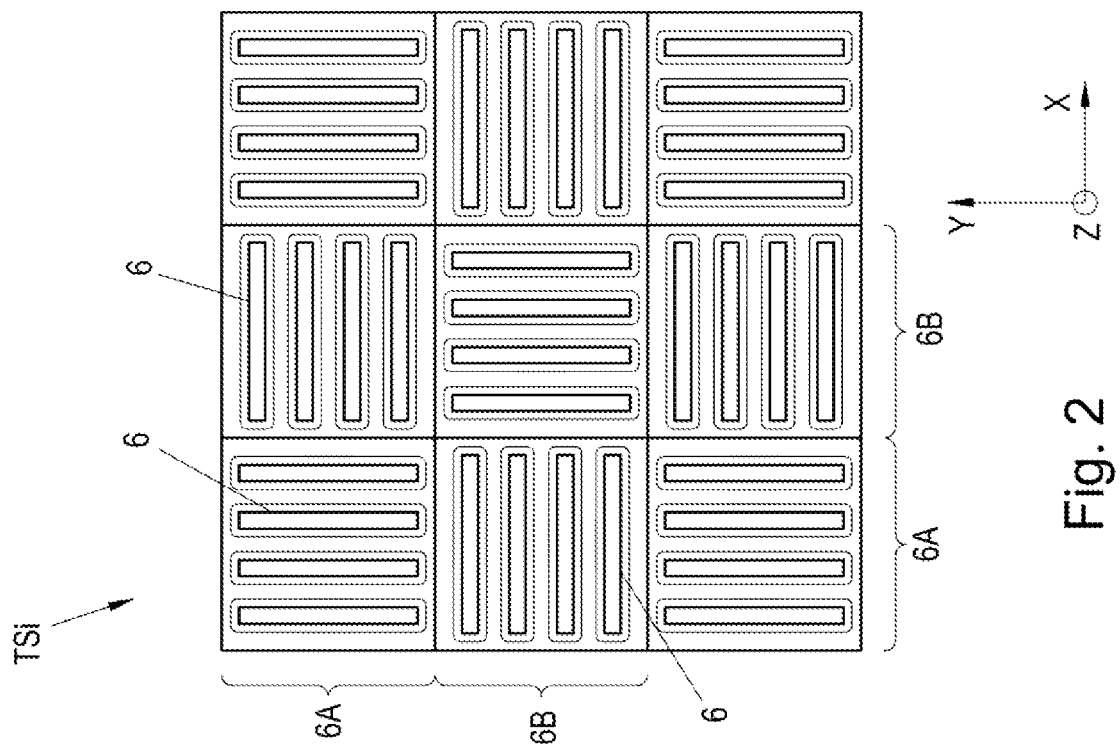

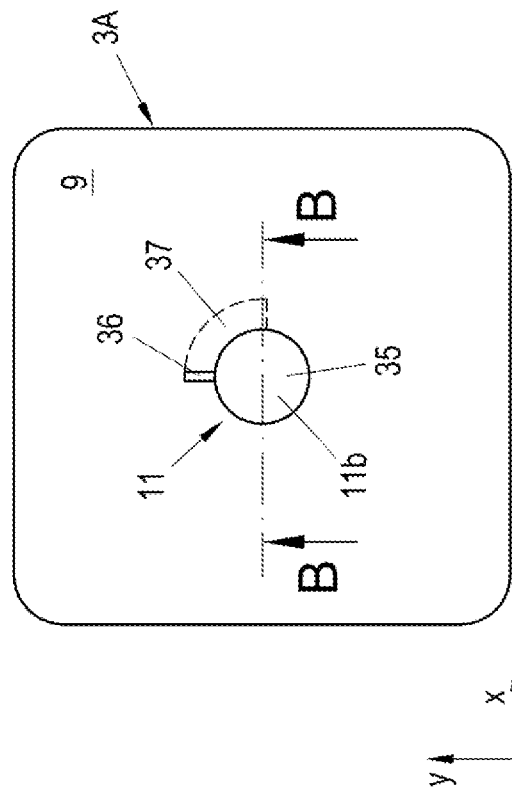
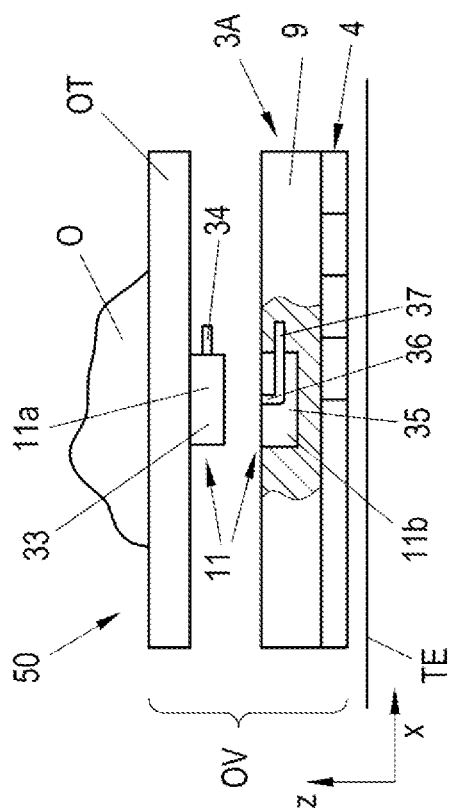
Fig. 15a
Fig. 14a
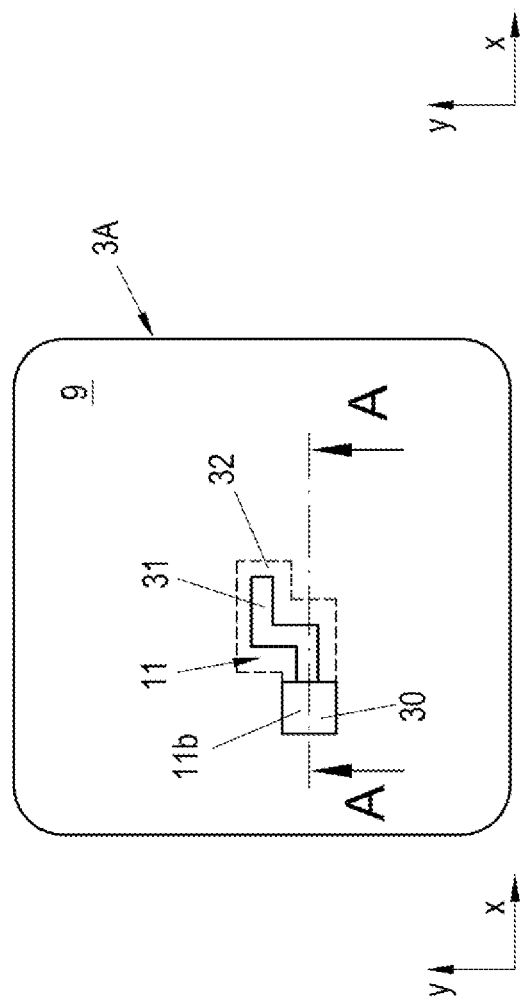
Fig. 15b
Fig. 14b

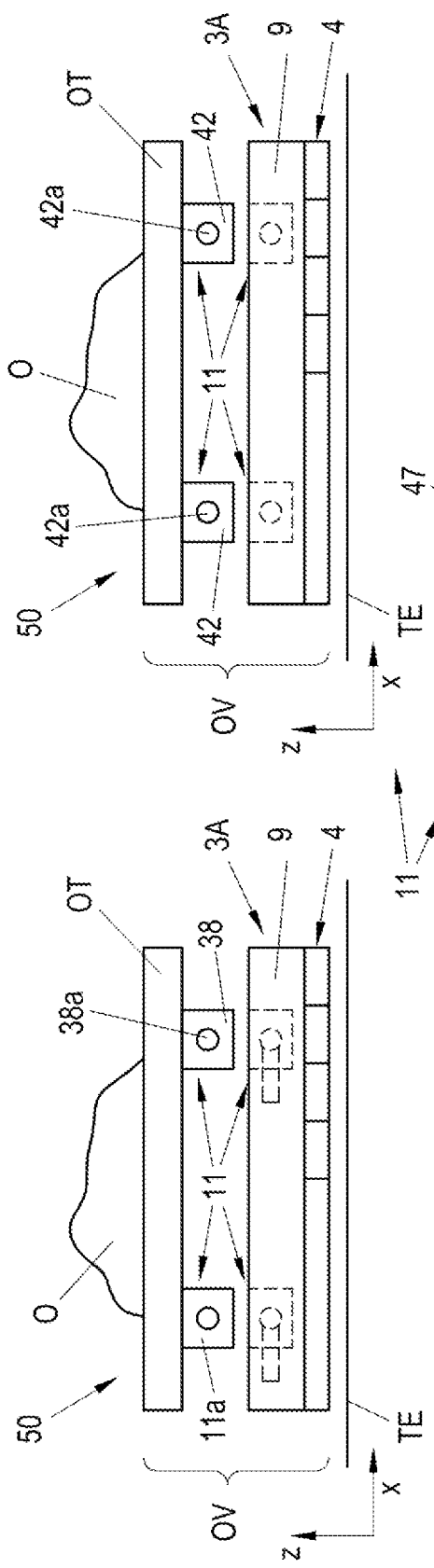
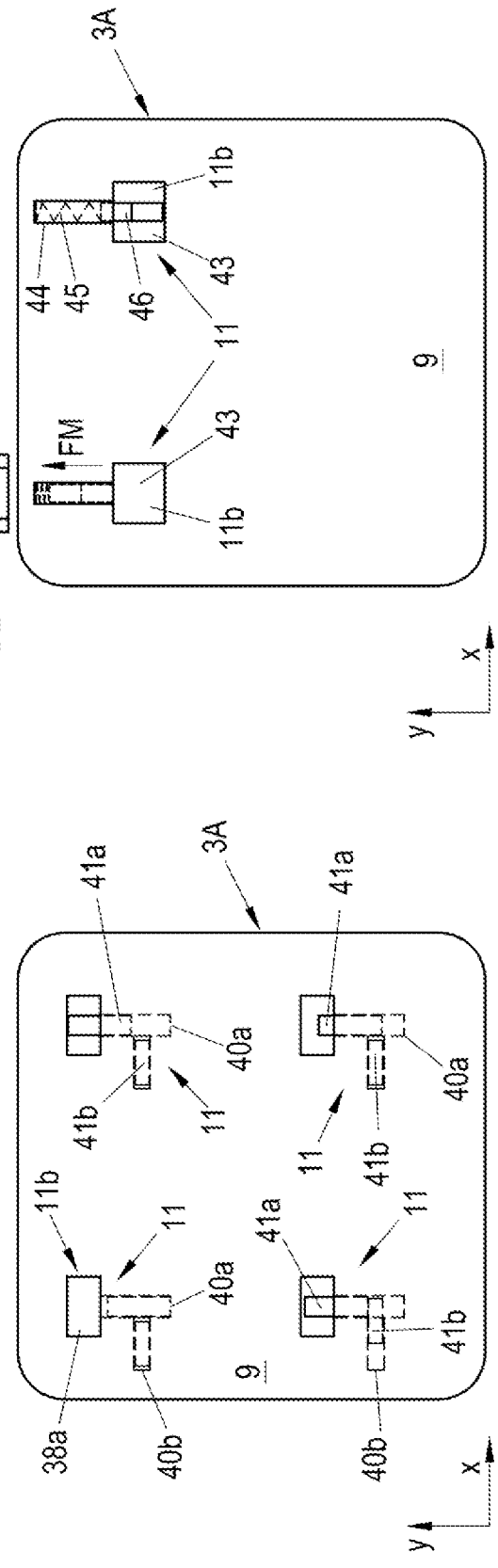

TRANSPORT DEVICE

The invention relates to a transport device in the form of a planar motor having at least one transport segment which forms a transport plane and having at least one transport unit which can be moved at least two-dimensionally in the transport plane, drive coils or movable permanent magnets being arranged on the transport segment and drive magnets being arranged on the transport unit, or vice versa, the drive coils or the movable permanent magnets interacting magnetically with the drive magnets in order to move the transport unit at least two-dimensionally in the transport plane. The invention also relates to a transport unit for a transport device in the form of a planar motor and to a method for operating a transport device in the form of a planar motor.

Planar motors are well known in the prior art. For example, U.S. Pat. No. 9,202,719 B2 discloses the basic structure and mode of operation of such a planar motor. A planar motor substantially has a transport plane which is generally formed from one or more transport segments and in which one or more transport units can be moved at least two-dimensionally. A driving force acting on the transport units is generated by the interaction of the magnetic fields of the transport segments and the transport units. In order to cause a movement of the transport unit in a specific movement direction, at least one of the magnetic fields, i.e., that of the transport segment and/or that of the transport unit, must be temporally changeable in order to follow the movement of the transport unit. In most cases, however, only one magnetic field, usually that on the transport segment, is temporally changeable and the respective other magnetic field, usually that on the transport units, is usually constant.

Temporally changeable magnetic fields can be generated, for example, by coils (electromagnets) or moving (e.g., rotating) permanent magnets that can be arranged both on the transport unit and on the transport segment. The coils are frequently also called drive coils. Temporally unchanging, i.e., constant, magnetic fields are typically generated by means of permanent magnets. These components are frequently called drive magnets. Depending on the embodiment of the planar motor, they can also be arranged both on the transport unit and on the transport segment. Due to simpler activation, the drive coils are often arranged on the transport segment of the planar motor and the drive magnets are arranged on the transport unit.

The drive coils are usually activated by a control unit in order to generate a moving magnetic field in the desired movement direction. Drive magnets are distributed at least two-dimensionally on the transport unit and interact with the moving magnetic field so that predetermined forces and moments can be exerted as desired on the transport unit in the direction of the degrees of freedom of movement of the transport unit (at most three translational degrees of freedom of movement and three rotational degrees of freedom of movement). The forces and moments which cause the transport unit to move in the direction of one of the degrees of freedom of movement are usually referred to as driving forces. The forces and moments which are exerted by the transport segment on the transport unit and are used to maintain the current state of movement are usually referred to as levitation forces. By means of the levitation force, for example, an air gap can be generated and maintained between the transport unit and the transport segments and/or process forces or moments can be compensated for. Even if the transport plane is not aligned horizontally, for example, the position of the transport unit can be kept constant by a corresponding levitation force.

In order to make the two-dimensional movement of the transport unit, which is characteristic of the planar motor, possible, a two-dimensional interaction of the magnetic fields of the transport segments and the transport units is required, one of the two magnetic fields having to be temporally changeable in at least two dimensions or both magnetic fields having to be temporally changeable in at least one dimension. The drive coils and the drive magnets are advantageously arranged such that, in addition to a one-dimensional movement along the axes spanned by the transport plane, more complex two-dimensional movements of the transport unit in the transport plane are also possible. If the drive coils and the drive magnets are advantageously arranged in such a way that the transport unit can be guided and moved in the direction of all six degrees of freedom by means of the drive and levitation forces, a mechanical guide is not required. This is often referred to as a bearingless planar motor.

A planar motor can be used, for example, as a transport device in a production process, with it being possible for very versatile transport processes with complex movement profiles to be carried out.

In EP 3 172 156 B1 and EP 3 172 134 B1, for example, such applications of a planar motor as a transport device are shown. For example, two planar motors are arranged adjacent to one another and transport units can be moved on both planar motors. This allows transport units to move independently of one another in two planes. In another embodiment, a planar motor and one or more continuous conveyors interact in order to manipulate products in a certain way. The transport units of the planar motor can each be individually moved two-dimensionally in a vertical plane. The planar motor allows a very versatile movement in the vertical plane, but the versatility is limited by the continuous conveyor.

WO 2018/176137 A1 discloses a transport device in the form of a planar motor, in which transport units are firmly connected to one another by means of relatively is complex mechanical constructions. The mechanical construction serves as a kind of manipulation apparatus. The manipulation apparatus is actuated, for example in order to carry out a vertical lifting movement, by a relative movement of the transport units.

An object of the invention is therefore that of providing a transport device in the form of a planar motor and a corresponding transport unit that allow a more versatile process management.

The object is achieved according to the invention in that at least one coupling unit is provided in the transport device, in that at least one coupling apparatus for releasably coupling the transport unit to the coupling unit is arranged on the transport unit and on the coupling unit in each case, in that the transport unit and the coupling unit can be coupled, at least temporarily, by means of the coupling apparatuses to form an assembly by way of a relative movement in the transport plane, and in that the coupling apparatuses interact in the coupled assembly in order to limit a relative movement between the transport unit and the coupling unit in at least one degree of freedom of movement. Either a further transport unit or an object carrier for receiving an object is preferably provided as the coupling unit. If a further transport unit is provided as the coupling unit, then the at least two transport units can be coupled by means of the coupling apparatuses to form a transport unit assembly in which the transport units can be jointly moved in the transport plane.

If an object carrier is provided as the coupling unit, then the transport unit can be coupled to the object carrier to form an object carrier assembly, the object carrier in the object carrier assembly being movable in the transport plane by means of the transport unit. The coupling apparatuses are preferably designed to be form-fitting and/or frictional. By forming a transport unit assembly, for example, greater forces can be generated than when using a single transport unit. This means, for example, that a larger load can be transported than when using a single transport unit. Advantageously, larger process forces of a work process can thereby also be absorbed and/or larger objects can be transported. The object carrier assembly has the advantage, for example, that different object carriers can be used which, for example, can be exchanged in a simple manner only by the relative movement.

Preferably, the coupling apparatuses each have at least part of a blocking apparatus, the blocking apparatus being designed to limit the relative movement between the transport unit and the coupling unit in the assembly in an additional degree of freedom of movement. The blocking apparatus can preferably be actuated by a relative movement between the transport unit and the coupling unit, or an actuating unit for actuating the blocking apparatus is provided in the transport device. This ensures that the assembly is not released undesirably and the transport unit and the coupling unit are decoupled.

The actuating unit is preferably designed as a stationary, preferably mechanical or magnetic, actuating unit, and/or an actuating unit for actuating the blocking apparatus and an actuator for actuating the actuating unit are provided at least on the transport unit (which also comprises a product carrier on the transport unit for receiving a product) or the coupling unit. The blocking apparatuses can thus be actuated in different ways, depending on the given boundary conditions.

It is advantageous if at least one coupling element is provided in the coupling apparatus of the transport unit and at least one receiving unit is provided in the coupling apparatus of the coupling unit, or vice versa, the coupling element being provided to interact with the receiving unit for releasably coupling the transport unit to the coupling unit. This creates a form-fitting coupling by means of which several degrees of freedom of movement can be blocked.

The blocking apparatus preferably has at least one clamping element and at least one clamping opening interacting therewith, the clamping element being arranged on the coupling element and the clamping opening being arranged in the receiving unit, or vice versa. As a result, an additional degree of freedom of movement can be blocked simply.

The coupling apparatuses preferably each have at least one magnetic element, the magnetic elements being provided to generate a magnetic force of attraction between the transport unit and the coupling unit. As a result, the coupling apparatuses can be designed purely magnetically or magnets can be provided which support the coupling process.

The object is further achieved by way of a transport unit in that at least one coupling apparatus is provided on the transport unit, which apparatus is designed to releasably couple the transport unit to a coupling unit to form an assembly by way of a relative movement between the transport unit and the coupling unit in the transport plane, the coupling apparatus in the coupled assembly interacting with the coupling unit in order to limit a relative movement between the transport unit and the coupling unit in at least one degree of freedom of movement, the coupling apparatus preferably being designed to be form-fitting and/or frictional.

The object is also achieved by way of a method in that the at least one transport unit is moved in the transport plane relative to the coupling unit, or vice versa, and in that the transport unit and the coupling unit are coupled to form an assembly by the relative movement by means of the coupling apparatuses, the blocking apparatus preferably being actuated in the coupled state.

It is advantageous that a further transport unit is used as the coupling unit, that the transport units are coupled to form a transport unit assembly, and that the transport unit assembly moves in the transport plane by at least some of the drive magnets of one of the at least two transport units interacting magnetically with the drive coils or the movable drive magnets of the transport segment or by at least some of the drive coils or the movable drive magnets of one of the at least two transport units interacting magnetically with the drive magnets of the transport segment.

Advantageously, the transport unit assembly is moved to a work station where a work process is carried out in which process forces act on the transport unit assembly and/or the transport unit assembly is loaded with at least one object, the transport unit assembly being decoupled into the at least two transport units after completion of the work process.

Figure 1B:
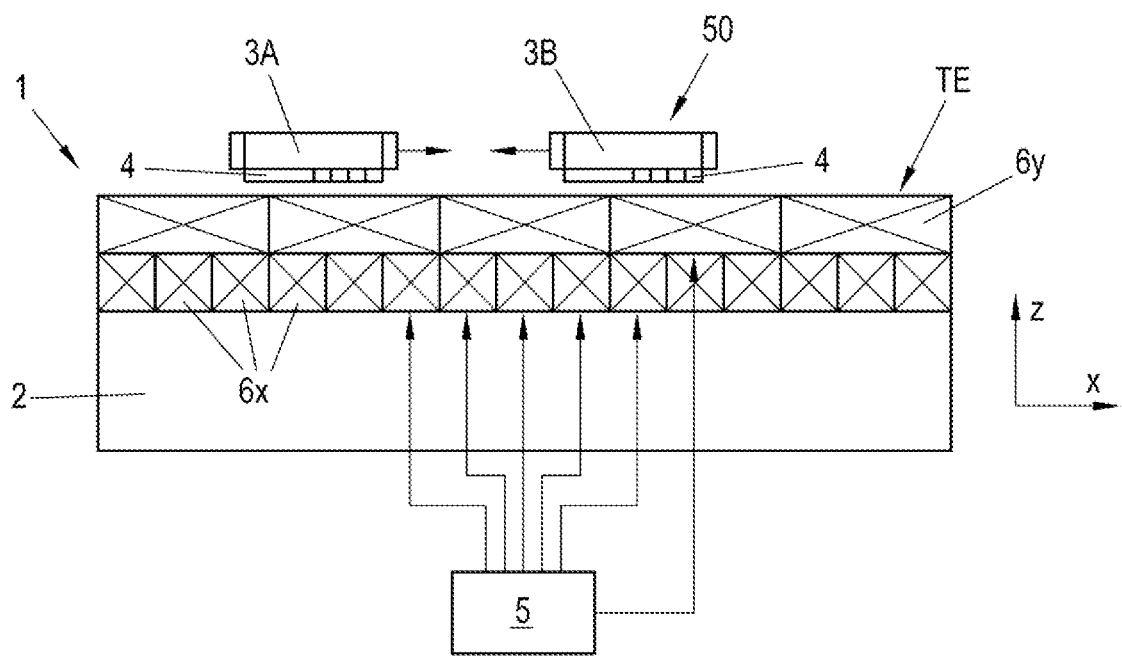
Figure 4A:
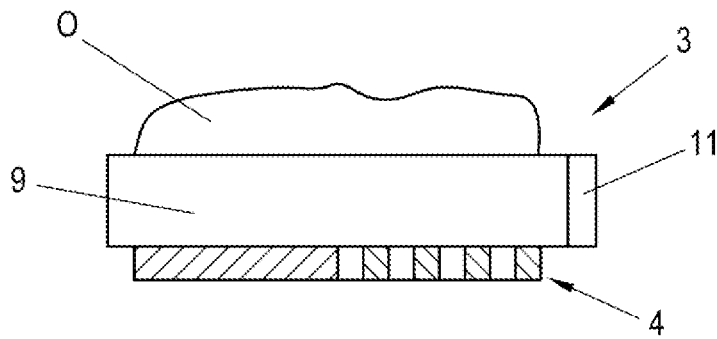
Figure 4B:
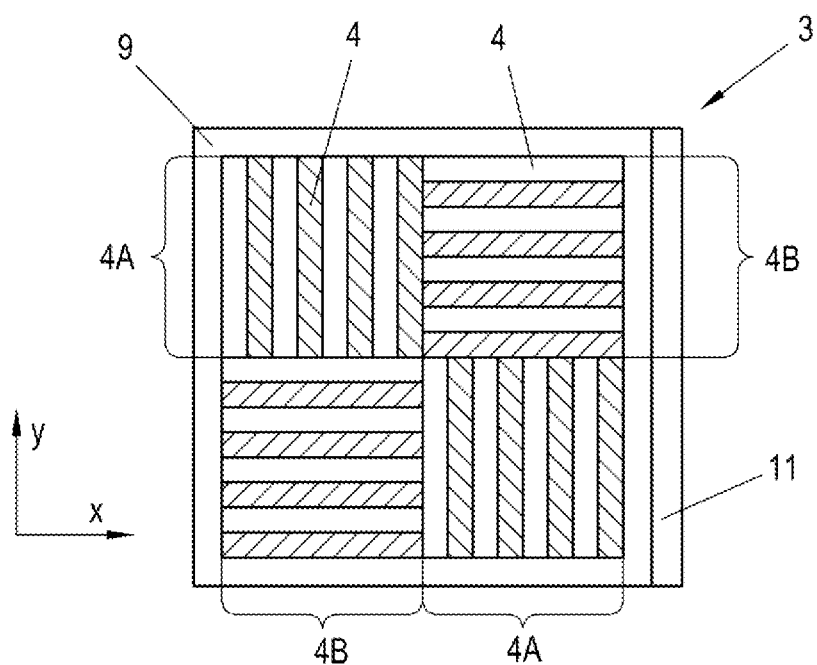
Figure 4C:
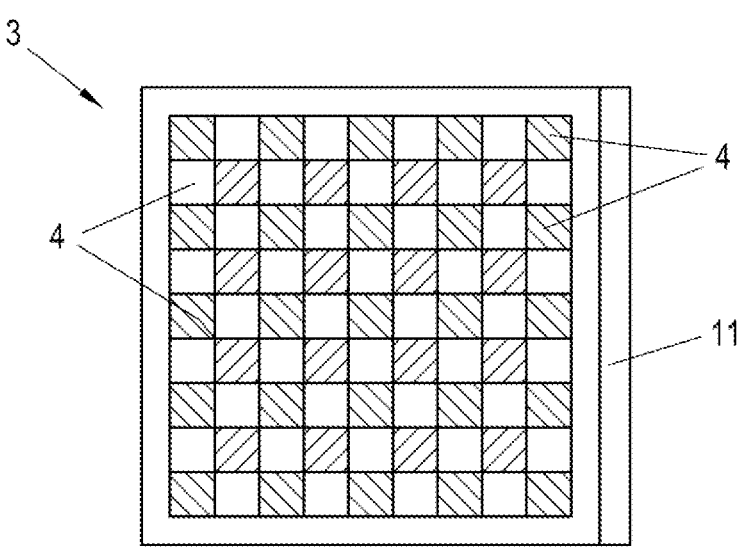
Figure 5:
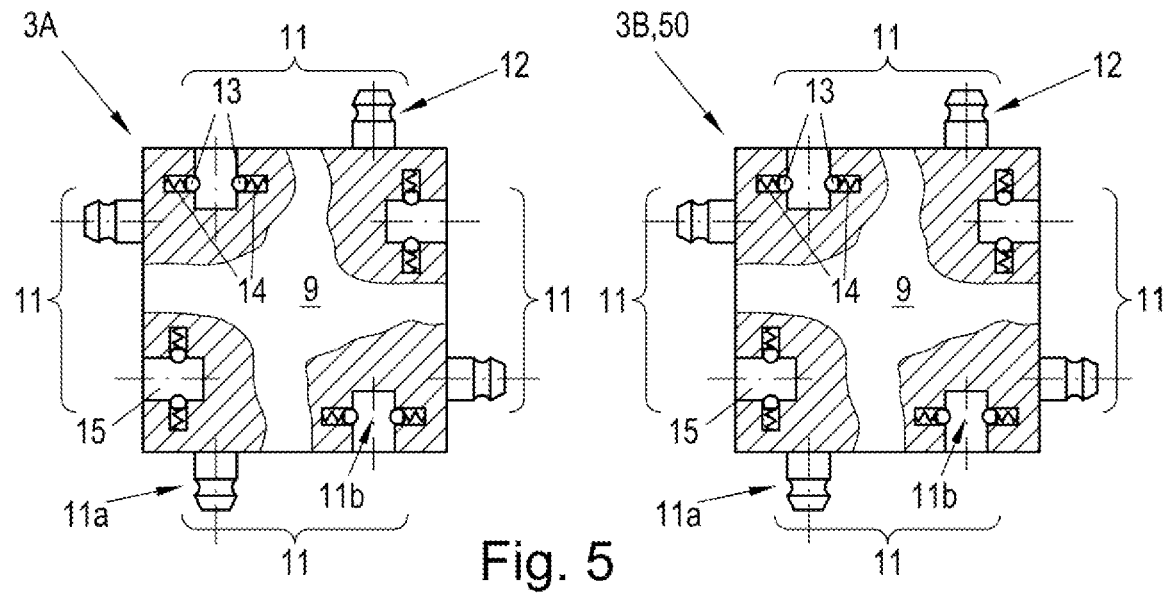
Figure 6:
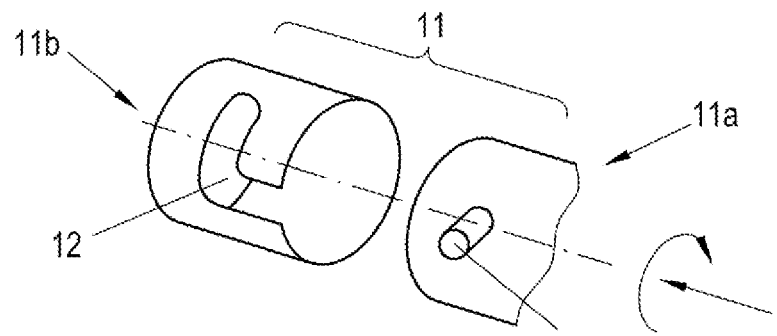
Figure 7:
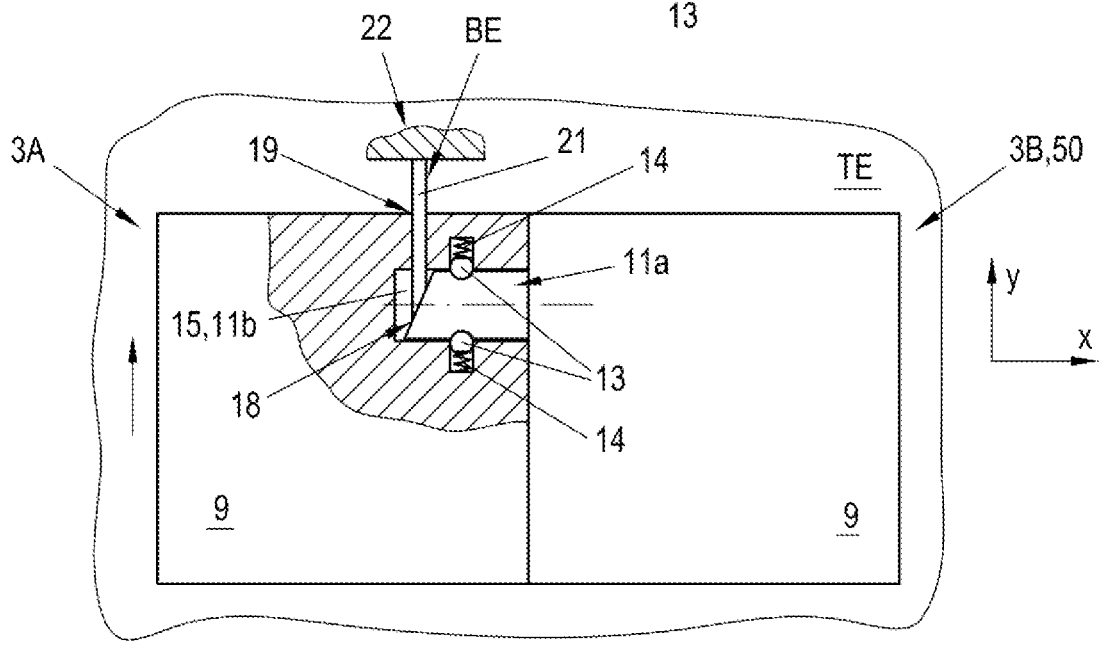
Figure 8:
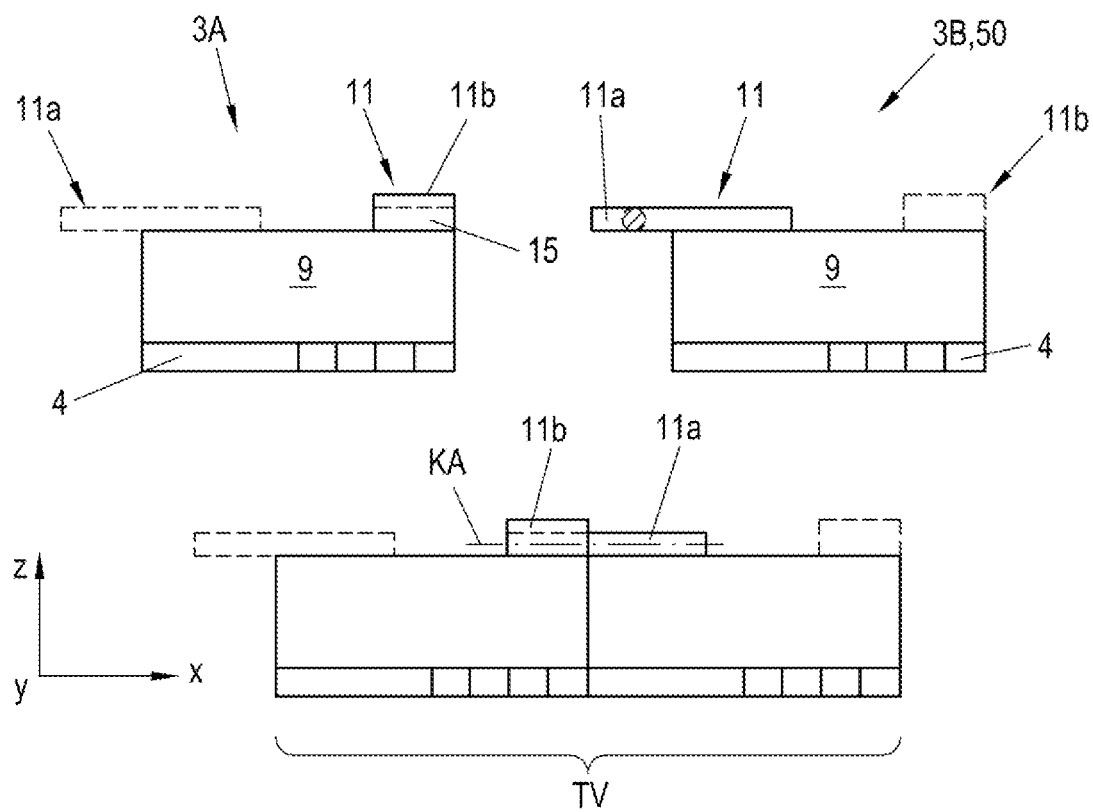
Figure 9:
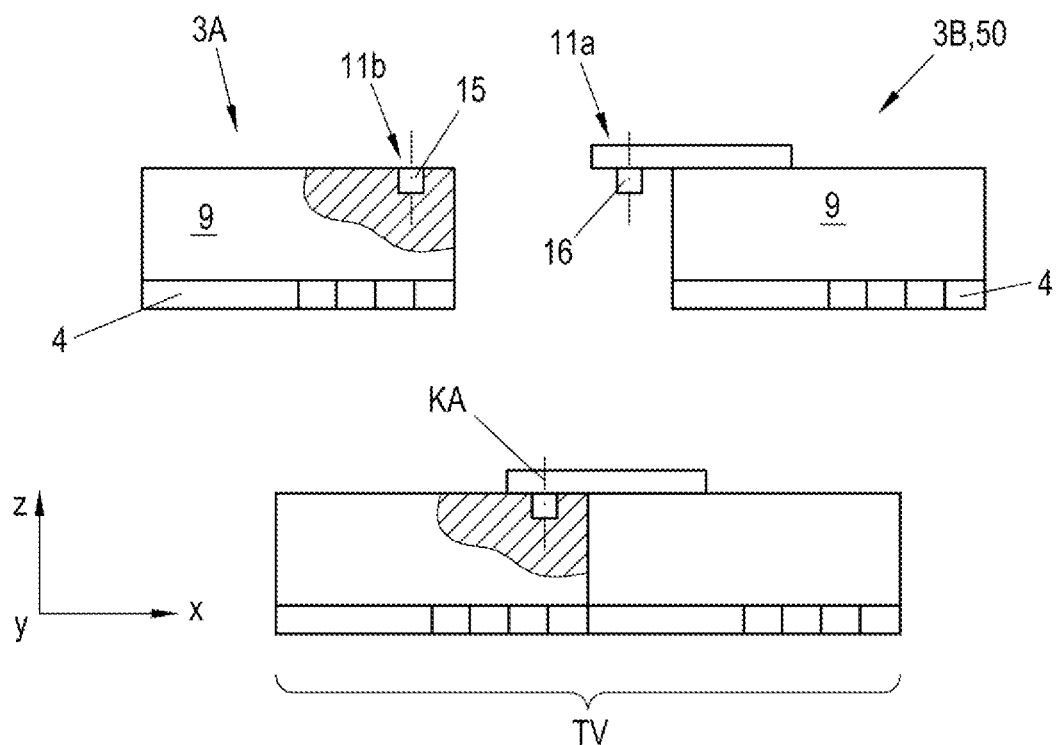
Figure 10:
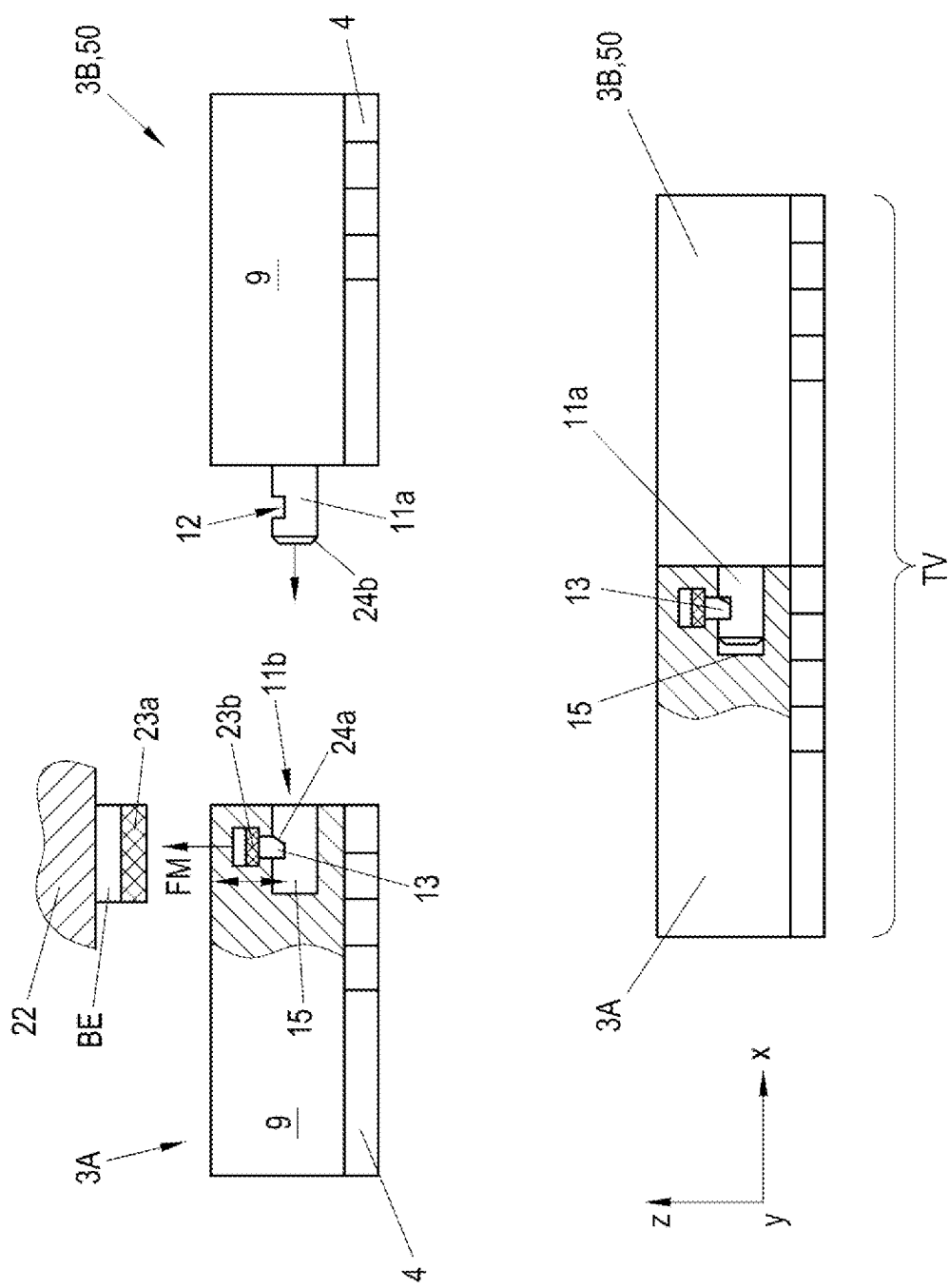
Figure 11A:
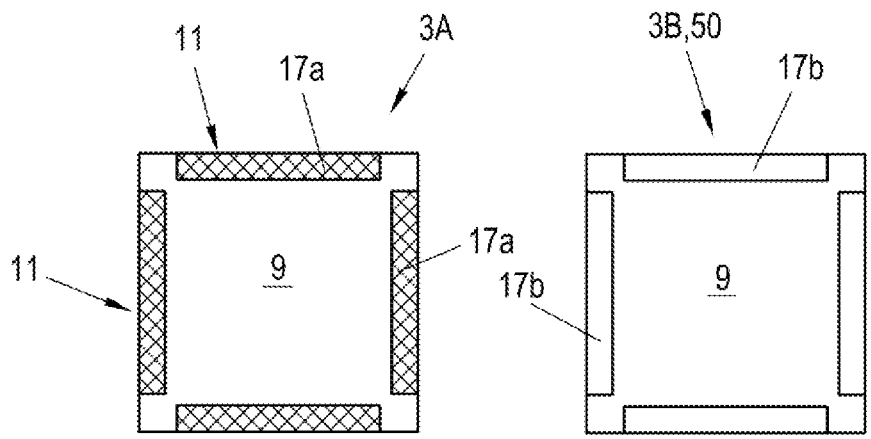
Figure 11B:
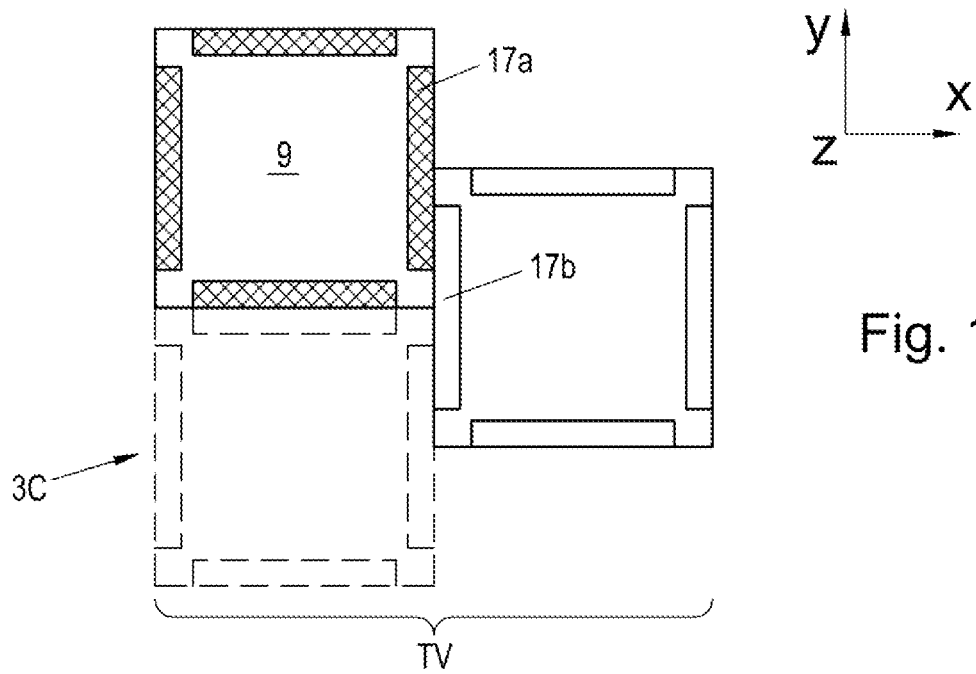
Figure 11C:
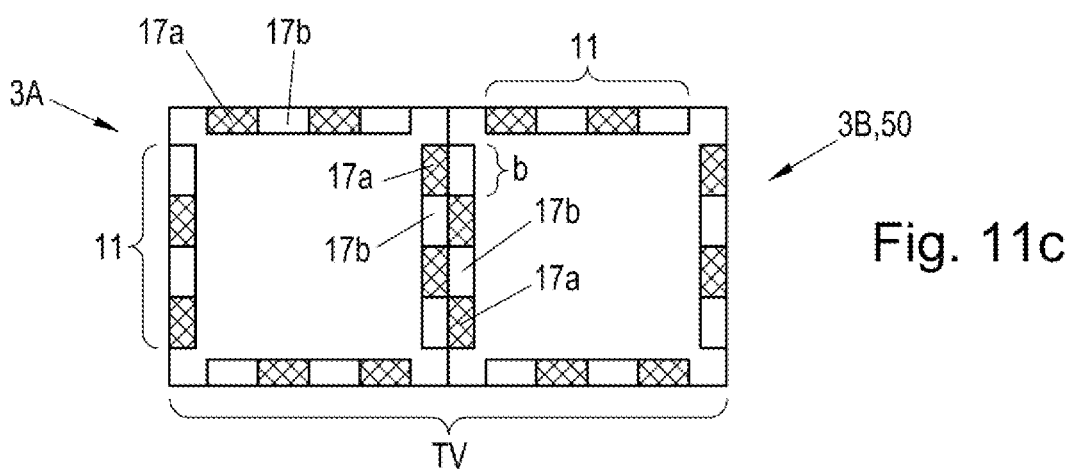
Figure 12A:
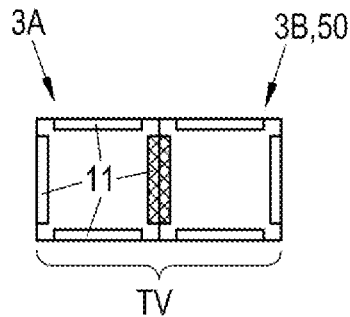
Figure 12B:
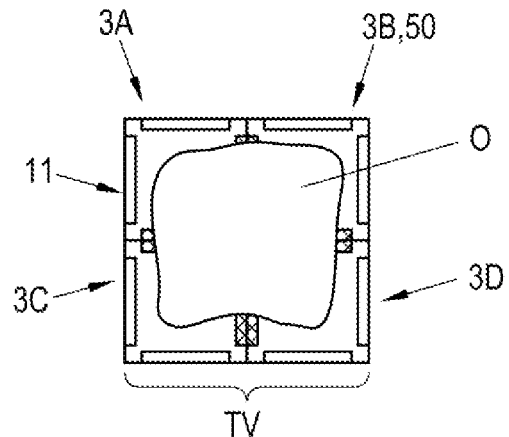
Figure 12C:
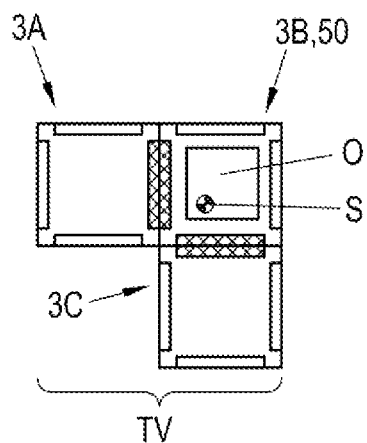
Figure 12D:
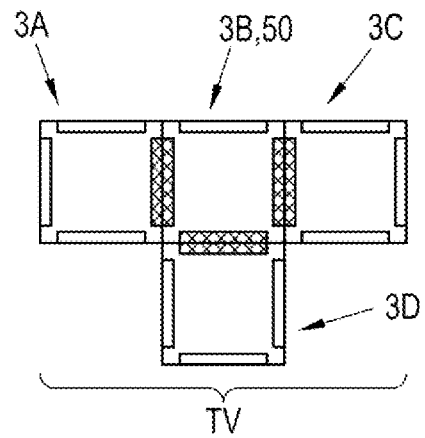
Figure 12E:
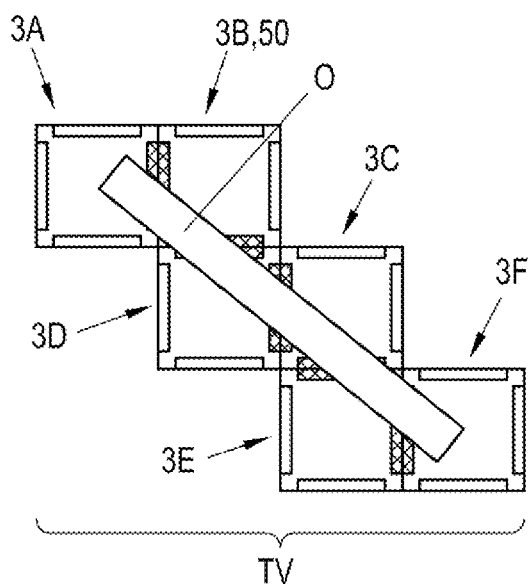
Figure 12F:
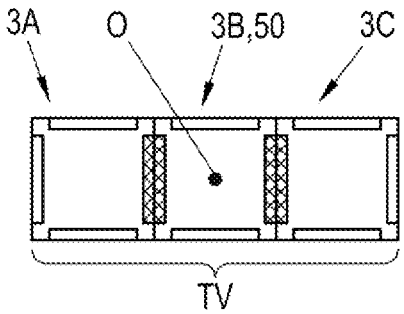
Figure 13:
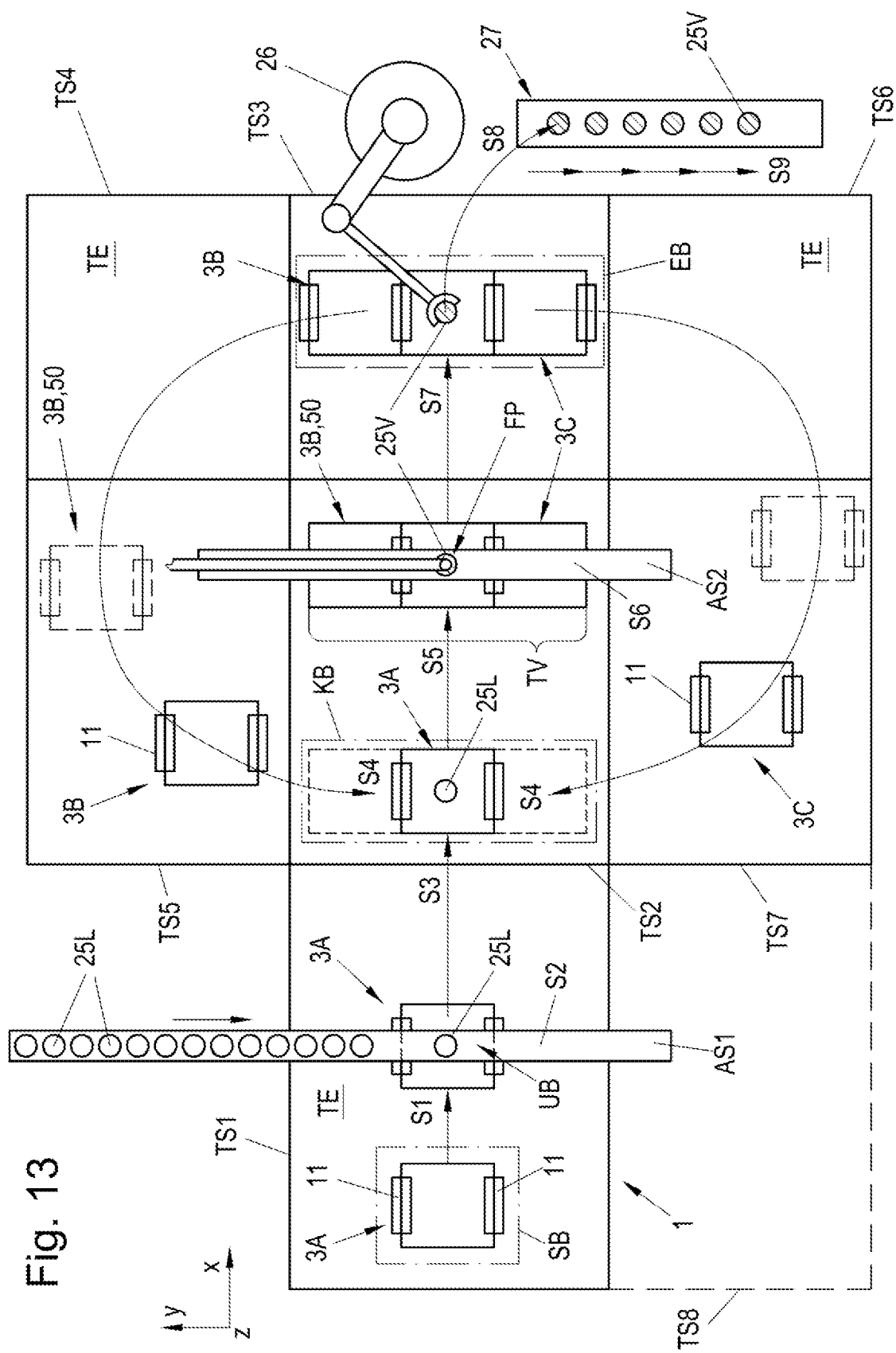

The present invention is described in greater detail below with reference to FIGS. 1 to 17b which show, by way of example, advantageous embodiments of the invention in a schematic and non-limiting manner. In the drawings:

FIG. 1a-1b show an example of a transport device in the form of a planar motor in a plan view and in a front view, FIG. 2 shows a possible arrangement of drive coils on a transport segment, FIG. 3a-3b show a possible arrangement of movable permanent magnets on a transport segment, FIG. 4a-4b show a transport unit of a transport device in the form of a planar motor having a coupling apparatus in a side view and a view from below, FIG. 4c shows a transport unit having a coupling apparatus in a view from below with an alternative arrangement of the drive magnets, FIG. 5 shows a plan view of two transport units having a plurality of coupling apparatuses, FIG. 6 shows a coupling apparatus having a bayonet mount, FIG. 7 shows a plan view of two transport units having a coupling apparatus and an external actuating unit, FIG. 8-10 show two transport units having coupling apparatuses in a side view in the decoupled and in the coupled state, FIG. 11a-11c each show a plan view of two transport units having magnetic coupling apparatuses, FIG. 12a-12f show different alternative embodiments of a transport unit assembly, FIG. 13 shows a bottling system having a transport device according to the invention, FIG. 14a-17b show different embodiments of the coupling of a transport unit and an object carrier.

By way of example, FIG. 1a shows an embodiment of a transport device 1 according to the invention in a plan view. FIG. 1b shows the transport device 1 in a front view. The transport device 1 has a stator 2 which forms a transport plane TE. In the example shown, the transport plane TE is a horizontal plane having a vertical axis Z, a longitudinal axis X and a transverse axis Y. A different arrangement would of course also be possible, for example one that is vertical or inclined at a specific angle. This substantially depends on the desired use of the transport device 1. The stator 2 is constructed here from a plurality i of transport segments TSi which are adjacent to one another in order to form the transport plane TE. As a result, the transport device 1 can have a modular design and transport planes TEi having differently sized surfaces can be produced. Of course, this modular structure is only optional and the stator 2 could also be made up of only one single assembly. In the transport plane TE of the stator 2, one or more transport units (hereinafter generally provided with the reference sign 3) can be moved at least two-dimensionally. In the example shown, these are the transport units 3A, 3B. For example, a movement would only be possible in one axial direction along the longitudinal axis X or the transverse axis Y or also a two-dimensional movement profile with a Y coordinate and an X coordinate, as indicated by the movement profile BPB of the transport unit 3B. In a corresponding design of the transport device 1, the other four degrees of freedom of movement can also be used, at least in a limited manner.

For this purpose, drive cons 6 are provided on the stator 2, in particular on the transport segments TSi, which drive coils are activated by one (or more) planar motor control unit(s) 5 (hardware and/or software). For example, wound wire coils or PCB coils (PCB=printed circuit board) arranged on a printed circuit board are used as drive coils 6. An electric current can be impressed into the drive coils 6 in order to generate a magnetic field. The power electronics which may be required for this can be arranged in the planar motor control unit 5 or on the stator 2 (e.g., on the transport segments TSi). A substantially moving magnetic field can be generated by appropriate activation of drive coils 6 which are arranged next to one another. The drive coils 6 are advantageously arranged on the stator 2 in such a way that the magnetic field can extend in any directions in the transport plane TE in order to produce corresponding movement profiles of the transport units 3. The transport plane TE is not to be understood here as a plane in the mathematical sense, but rather as a flat transport surface which is delimited by the relevant stator 2 and on s which the transport units 3 can move. The drive coils 6 can be arranged on the stator 2 in one plane, e.g., in a plurality of coil groups each offset by 90° (see FIG. 2) or in a herringbone arrangement (see, for example: Jansen, J. W., 2007. Magnetically levitated planar actuator with moving magnets. In: electromechanical analysis and design, Eindhoven: Eindhoven University of Technology DOI: 10.6100/IR630486). However, the drive coils 6 can also be arranged in a plurality of planes one above the other, as will be explained below.

In the example shown in FIGS. 1a and b, the drive coils 6 are arranged in two layers one above the other in the Z direction. In a first layer, drive coils 6y are oriented in such a way that they can be used to generate forces on the transport unit 3 in the Y and Z directions. In a second layer, the drive coils 6x are oriented in such a way that they can be used to generate forces on the transport unit 3 in the X and Z directions. The two layers extend substantially completely over the entire transport plane TE in order to form the largest possible range of movement for the transport units 3. In the example shown, the first layer having the drive coils 6y is closer to the surface in the Z direction and thus closer to the transport units 3 than the second layer having the drive coils 6x, as can be seen in FIG. 1b. Of course, this is only an example and the arrangement could be reversed.

The drive coils 6x and 6y also do not have to be aligned orthogonally to one another. One or more further layers of drive coils 6 could also be provided. Furthermore, the drive coils 6 of one layer can be arranged at any angle to the drive coils 6 in the adjacent layers. However, the drive coils 6 as a whole allow movement in both the X and Y directions. The drive coils 6 are preferably designed as air coils without an iron core in order to reduce the permanent magnetic force of attraction between the transport units 3 and the transport segments TSi of the stator 2. As a result, the transport units 3 are attracted less strongly by the drive magnets 4 in the direction of the transport plane TE. Drive magnets 4, for example permanent magnets, are arranged on each of the transport units 3 and interact with the drive coils 6 in order to exert a driving force on the transport unit 3.

Depending on the activation of the drive coils 6, a moving magnetic field, which interacts with the drive magnets 4 in order to move the transport unit 3, is thus generated. During operation, an air gap is provided between the drive coils 6 of the stator 2 and the drive magnets 4 of a transport unit 3. In addition to the two-dimensional movement in the transport plane TE, a certain movement of the transport units 3 in the vertical direction, normal to the transport plane TE, here in the Z direction, is also possible. The drive coils 6 therefore also cause (levitation) forces in the Z direction. By appropriate activation of the drive coils 6, the air gap can be increased and decreased to a limited extent, as a result of which the transport unit 3 can be moved in the vertical direction. The extent of the available freedom of movement in the vertical direction depends substantially on the structural design of the transport device 1, in particular on the maximum magnetic field that can be generated by the drive coils 6 and the drive magnets 4, as well as the mass and load of the transport unit (e.g., the weight of a transported object). Depending on the size and design of the transport device 1, the available range of movement in the vertical direction can be, for example, in the range from a few mm to several centimeters. A rotational movement of the transport units 3A, 3B about the Z axis and, to a limited extent, also about the Y and X axes is possible.

External mounting of the transport units 3 can be dispensed with in the example shown. The transport units 3 levitate purely due to the magnetic (levitation) force which is generated by the drive magnets 4 of the transport unit 3 and the drive coils 6 of the transport segment TSi and acts here in the Z direction. However, the desired air gap between the drive coils 6 and drive magnets 4 does not necessarily have to be generated or maintained purely magnetically, but the transport units 3 can also be mounted in any other way. Any suitable mechanisms can interact for this purpose, for example mechanical, magnetic, electromagnetic or pneumatic mechanisms, etc. In the example shown, a planar motor control unit 5 is provided by means of which the drive coils 6 of the stator 2 can be activated. The planar motor control unit 5 can, for example, also be connected to a higher-level control unit (not shown), for example in order to jointly control and synchronize a plurality of stators 2 or also a plurality of transport devices 1.

Of course, the planar motor control units 5 could also be integrated into the higher-level control unit. A segment control unit (hardware and/or software) can also be provided for each transport segment TSi, or a group of transport segments TSi and can also be integrated in a planar motor control unit 5 or higher-level control unit or can be designed as a separate unit. The planar motor control unit 5 and/or the higher-level control unit can, for example, be linked to a user interface (not shown), for example a computer, via which the transport unit 1 can be controlled. The movement profiles of transport units 3 can be synchronized or coordinated with one another via the planar motor control unit 5 and/or the higher-level control unit, for example to avoid a collision of transport units 3 or objects transported by them. A control program which carries out the desired movement profiles of the transport units 3 runs on the planar motor control unit 5. The structure and mode of operation of a planar motor are, however, known in principle, which is why no detailed description is given at this point.

According to the invention, at least one transport unit 3A and at least one coupling unit 50 are provided in the transport device 1, at least one coupling apparatus 11 for releasably coupling the transport unit 3A to the coupling unit 50 being arranged on the transport unit 3A and on the coupling unit 50 in each case. The transport unit 3A and the coupling unit 50 can be coupled, at least temporarily, by means of the coupling apparatuses 11 to form an assembly by way of a relative movement in the transport plane TE, the coupling apparatuses 11 interacting in the coupled assembly in order to limit a relative movement between the transport unit 3A and the coupling unit 50 in at least one degree of freedom of movement. According to a first alternative embodiment of the invention, the at least one coupling unit 50 can be a further transport unit 3B, it being possible for the at least two transport units 3A, 3B to be coupled by means of the coupling apparatuses 11 to form a transport unit assembly TV. The transport units 3A, 3B can be jointly moved in the transport plane TE in the coupled state. According to a second alternative embodiment of the invention, the at least one coupling unit 50 can be an object carrier OT for receiving an object O, it being possible for the transport unit 3A to be coupled to the object carrier OT to form an object carrier assembly OV in which the object carrier OT can be moved in the transport plane TE by means of the transport unit 3*k* The first alternative embodiment is explained in more detail below with reference to FIGS. 1*a* to 13. The second alternative embodiment is explained in more detail with reference to FIGS. 14*a* to 17*b*.

At least two transport units 3, here the transport units 3A, 3B on each of which at least one coupling apparatus 11 is arranged for releasably, and preferably directly, coupling the transport units 3A, 3B, are provided in the example according to FIGS. 1*a* and 1*b*. By means of the coupling apparatuses 11, the transport units 3A, 3B can be coupled, at least temporarily, to form a transport unit assembly TV, as shown in FIG. 1*a*. In this case, a transport unit assembly TV is moved as a part in the transport plane TE under the control of the planar motor control unit 5. As a result, very versatile production processes can be made possible using the transport device 1. For example, a transport unit assembly TV could be used to generate higher driving and levitation forces than a single transport unit 3A, 3B.

The transport unit assembly TV can be used, for example, to transport relatively heavy objects which, under certain circumstances, cannot be moved or can only be moved insufficiently using a single transport unit 3A, 3B. For example, if the object is arranged on only one transport unit 3A, one (or more) coupled transport unit(s) 3B, 3C, etc., could support the transport unit 3A (carrying the object), for example during acceleration phases. However, a transport unit assembly TV could also be used to increase the area for an object to be transported. Under certain boundary conditions (depending on the mass of the transport units 3, the mass of the transported objects or the number of coupled transport units 3), energy could be saved in the transport unit assembly TV because a further transport unit 3 (or more) can be moved using one transport unit 3 (or more). In the context of the invention, coupling is to be understood to mean that a relative movement between the coupled transport units 3A, 3B is limited in at least two degrees of freedom of movement. Releasable is to be understood here to mean that the coupling/decoupling can be carried out by controlling the movement of the transport units 3, which can be carried out, for example, via the planar motor control unit 5 of the transport device 1 or via a higher-level control unit.

In the example shown in FIGS. 1*a* and 1 *b*, the transport units 3A, 3B each have a base body 9 having a substantially rectangular base area. A coupling apparatus 11 is arranged on each of the four side faces of the base body 9. The coupling apparatuses 11 are indicated here only schematically and are advantageously designed to be compatible with one another. In general, this means that each coupling apparatus 11 of one transport unit 3 can preferably be coupled to each coupling apparatus 11 of another transport unit 3. For this purpose, the coupling apparatuses 11 are preferably standardized and identical on each of the transport units 3 in order to be able to couple any transport units 3 to one another. Of course, different types of coupling apparatuses 11 which are not compatible could also be provided on different transport units 3. This could be the case, for example, if it is desirable that only specific transport units 3 should be coupled and other transport units 3 should not be coupled.

The coupling apparatuses 11 are designed to limit the relative movement of the coupled transport units 3A, 3B in the transport unit assembly TV in at least one degree of freedom of movement, preferably in at least two degrees of freedom of movement. In the example shown in FIG. 1*a*, the coupled coupling apparatuses 11 of the transport unit assembly TV could be designed such that only the translational degree of freedom of movement in the X direction is blocked but an (at least limited) relative movement between the transport units 3A, 3B in the remaining five degrees of freedom of movement direction is possible (two translational degrees of freedom of movement in the Y and Z direction and three rotational degrees of freedom of movement about the three axes X, Y, Z).

For coupling, the transport units 3A, 3B can be moved toward one another, for example by the planar motor control unit 5 in the longitudinal direction X (or any other direction), as indicated by the arrows in FIG. 1*b* and are releasably coupled on contact by means of the coupling apparatuses 11. Of course, one of the transport units 3A, 3B could also be stationary and only the relevant other transport unit 3A, 38 is moved in the direction of the stationary transport unit 3A, 3B in order to carry out the coupling. The coupling could be carried out, for example, by the movement of the transport units 3A, 3B itself (e.g., due to the mass inertia of the transport units 3A, 3B and/or by generating corresponding driving forces on the transport units 3A, 3B). The coupling apparatuses 11 are indicated only schematically in FIG. 1*a* and 1 *b* and can be configured in a variety of ways, preferably to be form-fitting or frictional, as will be explained in detail in the following examples.

Furthermore, at least part of a blocking apparatus (not shown in FIGS. 1*a* and 1*b*) that can be actuated actively or passively could be provided on the transport units 3A, 3B, by means of which apparatus the relative movement of the transport units 3A, 36 in the coupled state can be limited in an additional degree of freedom of movement. This can, for example, prevent undesired releasing. A passive blocking apparatus can be actuated by a relative movement of the transport units 3A, 3B to be coupled. In this context, a relative movement is to be understood to mean a relative movement in one degree of freedom of movement or also a sequence of relative movements in different degrees of freedom of movement (e.g., translation and rotation sequentially). A suitable actuating unit (not shown) can be provided on at least one of the transport units 3A, 3B for actively actuating the blocking apparatus (blocking and/or unblocking). However, the blocking apparatus could also be actuated, for example, by an external actuating unit. For example, an external stationary actuating unit could be provided in the transport device 1, which unit could be arranged, for example, on the transport segment TSi, as will be explained in more detail below with reference to FIG. 7. If a blocking apparatus can be actuated actively, the actuating unit can be, for example, a suitable electric actuator or a suitable permanent magnet or electromagnet. If a blocking apparatus can be actuated passively, a suitable preloading element such as a spring type accumulator, which applies the actuating energy for the blocking apparatus, could be provided, as will be explained in more detail with reference to FIG. 5. In the case of a blocking apparatus which can be actuated actively, the actuating unit arranged on the transport unit 3A, 3B can be supplied with energy, for example via an electrical energy storage means arranged on the relevant transport unit 3, or energy can be made available inductively via the drive coils 6 of the stator 2. Furthermore, the blocking apparatus could be actuated by gravity, as will be explained in more detail with reference to FIG. 10.

After coupling, the transport unit assembly TV can be moved in the transport plane TE in a conventional manner, analogously to the individual transport units 3A, 3B. The movement of the transport unit assembly TV is controlled via the planar motor control unit 5 or via the higher-level control unit. Depending on the structural design of the coupling apparatuses 11, it may also be sufficient in the transport unit assembly TV if only the drive magnets 4 of one of the at least two transport units 3A or 3B interact with the drive coils 6 of the stator 2. The relevant other transport unit 3A or 3B is then substantially dragged. In a transport unit assembly TV, only some of the drive magnets 4 of one of the coupled transport units 3A, 3B can interact with the drive coils 6 of the stator 2. Above all, this offers advantages for moment formation, for example to compensate for uneven loading of the transport unit assembly TV.

If a higher driving force is required, for example when transporting relatively heavy objects and/or on an inclined transport plane TE, the drive magnets 4 of the two transport units 3A, 3B of the transport unit assembly TV can of course interact with the drive coils 6 of the stator 2 to generate the driving force. The transport unit assembly TV could in turn be decoupled by the movement of the transport units 3A, 3B itself (e.g., by generating an opposing driving force on the transport units 3A, 3B). It would also be conceivable for the releasing process to be supported by a releasing force. For example, a suitable releasing apparatus such as a release spring or an electric actuator could be provided, or the releasing force could also be applied magnetically. The structural design of the coupling apparatuses 11 can be configured in a variety of ways, for example a mechanical coupling apparatus 11, e.g., form-fitting or frictional, a magnetic coupling apparatus 11 or any combination of the options listed would be conceivable. Possible specific embodiments are explained in detail below with reference to FIGS. 4 to 11c.

An alternative arrangement of drive coils 6 on a transport segment TSi of a stator is shown in FIG. 2. The transport segment TSi is arranged in such a way that the drive coils 6 face the drive magnets 4 of the transport units 3 during operation in order to form the transport plane TE. The transport segment TSi here has a substantially square base area, but any other shapes are of course also possible. In order to allow a two-dimensional movement of the transport units 3 in the transport plane TE, the drive coils 6 here are divided into coil groups 6A, 6B which are arranged alternately next to one another in the same plane. The coil groups 6A, 6B are therefore equidistant from the surface of the stator 2 or the drive magnets 4 of the transport units 3 in the Z direction. The coil groups 6A, 6B each have a specific number of drive coils 6, with the alignment of the drive coils 6 of the coil groups 6A, 6B being different. In the example shown, four drive coils 6 are provided for each coil group 6A, 6B and the drive coils 6 of the coil groups 6A, 6B are rotated by 90 degrees with respect to one another. Of course, other arrangements, groupings and proportions would also be possible, such as the herringbone arrangement of the drive coils 6 that has already been mentioned. A known 2D Halbach arrangement of the drive magnets 4 is preferably provided on the transport unit 3 in this case, in which the magnetization direction of adjacent drive magnets 4 (=permanent magnets) is tilted by 90° relative to one another about the longitudinal axis of the drive magnets 4 in each case.

For example, a plurality of layers of drive coils 6 can also be provided in the Z direction in the alternative embodiment according to FIG. 2, with the coil groups 6A. 68 advantageously being alternated in the Z direction. As a result, a substantially continuous moving magnetic field could be generated in the directions of the Y and X axes. Like the alternative embodiment in FIGS. 1a and 1b, the arrangement of the drive coils 6 according to FIG. 2 allows a two-dimensional movement profile of the transport units 3 in the transport plane TE, here with coordinates in X and Y, A rotation of transport units 3 about an axis normal to the transport plane TEi is also possible (here about the Z axis).

An alternative embodiment of a transport segment TSi is shown in FIGS. 3a and 3b, with movable permanent magnets PM being provided on the transport segment(s) TSi instead of the drive coils 6. FIG. 3a shows the transport segment TSi in a plan view, with part of a top face (which faces the transport units 3 during operation) being shown broken away. FIG. 3b shows the transport segment. TSi in a side view. In order to generate a temporally changeable (moving) magnetic field, the permanent magnets PM can be activated by the control unit 5 so that they are moved in a specific way. By way of example, FIG. 3a schematically shows an arrangement of movable permanent magnets PM on the transport segment TSi. The permanent magnets PM are cylindrical here and each have a magnetic north pole and south pole, as indicated by the hatched areas.

Mobility is given here by the fact that the permanent magnets PM can each be rotated about an axis of rotation RA, as indicated by the arrows in FIGS. 3a and 3b. The axes of rotation RA each correspond here to the cylinder axis of the permanent magnets PM. The axes of rotation RA are here normal to the transport plane TE, i.e., they extend in the Z direction. In the example shown, each permanent magnet PM is associated with a drive unit AE, for example an electric motor, for driving the relevant permanent magnet PM. However, this is of course only an example and groups of a plurality of permanent magnets PM could also be activated by means of a drive unit AE. The drive units AE can be supplied with an electric current/an electric voltage by the control unit 5 in order to set the permanent magnets PM in a desired rotational movement. By rotating the permanent magnets PM at different times, a desired temporally changeable, i.e., moving, magnetic field can be generated in a specific direction, which magnetic field interacts with the magnetic field generated by the drive magnets 4 of the transport units 3 in order to exert a driving force and a levitation force on the transport unit 3. However, this is only to be understood as an example and permanent magnets PM having a different axis of rotation, for example the X or Y axis, could also be provided. In general, the movable permanent magnets PM can be distributed substantially over the entire transport segment TSi or can also extend over only part of the transport segment TSi, for example if a driving/levitation force is not to be generated at every point on the transport plane TE.

FIG. 4a shows a transport unit 3 in a side view, FIG. 4b shows the transport unit 3 in a view of the drive magnets 4 from below. FIG. 4c shows an alternative arrangement of the drive magnets 4. The transport unit 3 has a base body 9 having a substantially rectangular base area. On the underside, which faces the transport plane TE of the stator 2 during operation, drive magnets 4 are arranged in a known manner. For example, an object O to be transported can be arranged on the opposite upper side of the base body 9. A basic distinction is made between a 1D arrangement (FIG. 4b) and a 2D arrangement (FIG. 4c). Similar to the drive coils 6 on the transport segment TSi, the drive magnets 4 here are also divided into magnet groups 4A, 4B. A specific number of drive magnets 4 is provided in each magnet group 4A, 4B, drive magnets 4 of different magnetic polarity or magnetization direction being alternated, as indicated in FIG. 4b by the hatched and non-hatched drive magnets 4. The drive magnets 4 of a magnet group 4A are geometrically oriented differently from the drive magnets 4 of the other magnet groups 4B.

The known Halbach arrangement, in which the magnetization direction of adjacent drive magnets 4 is rotated by 90° relative to one another, has also proven to be advantageous. In general, however, the magnetization directions of adjacent drive magnets 4 within a magnet group 4A, 4B can also be rotated by a different angle relative to one another, for example 45°, The Halbach arrangement has the advantage that the magnetic flux on one side of the magnet group 4A, 4B (preferably on the side facing the transport plane TE) is greater than on the opposite side. A particularly advantageous, sinusoidal magnetic field image of the magnetic field of a magnet group 4A, 4B can be achieved if the respective outermost drive magnets 4 of the magnet group 4A, 4B have a reduced, in particular half the, magnet width compared to the interjacent drive magnets 4 of the magnet group 4A, 4B.

In the example shown in FIG. 4b, the drive magnets 4 of adjacent magnet groups 4A, 4B are at an angle of 90 degrees relative to one another. The magnet groups 4B can be provided, for example, for a movement of the transport unit 3 in the Y direction. For this purpose, the magnet groups 4B can interact with the drive coils 6y of the embodiment according to FIGS. 1a and 1b or with the coil groups 6B of the embodiment according to FIG. 2. The magnet groups 4A can be provided analogously for a movement of the transport unit 3 in the X direction. For this purpose, the magnet groups 4A can interact with the drive coils 6x of the embodiment according to FIGS. 1a and 1 b or with the coil groups GA of the embodiment according to FIG. 2. If the transport unit 3 is rotated by 90 degrees, however, the magnet groups 4B can also interact with the drive coils 6x or coil groups GA for movement in the X direction and the magnet groups 4A can interact with the drive coils 6y or coil groups 6B for movement in the Y direction.

In the 2D arrangement (FIG. 4c), individual drive magnets 4 of different polarity or magnetization direction are arranged like a chessboard, as indicated by the different hatching. Of course, the 1D and 2D arrangements shown are only to be understood as examples and it is immediately apparent that there can be a large number of different options for the 1D and 2D arrangements. The square shape of the base body 9 of the transport unit 3 shown is also only to be understood as an example and other shapes would also be conceivable. For example, a transport unit 3 could also be provided with a base body 9 having a round base area. The drive magnets 4 could then be arranged in a ring, with magnet groups 4A, 48 being alternated in the circumferential direction.

At this point, it should be mentioned that the embodiments of the transport device 1 shown with reference to FIG. 1a-4c are of course only to be understood as examples and are non-limiting. As mentioned at the outset, the transport device 1 can in particular also have a substantially reversed structure which of course is also included in the invention. This means that the temporally changeable magnetic field can also be generated on the transport units 3, for example, and a magnetic field which is not temporally changeable is generated on the transport segments TSi of the stator 2. For this purpose, the drive coils 6 or the movable permanent magnets PM can be provided on the transport units 3 and the drive magnets 4 can be arranged on the transport segments TSi of the stator 2, In order to move the transport units 3, the drive coils 6 or the movable permanent magnets PM would then be activated accordingly. For this purpose, for example, a separate control unit could be arranged on each of the transport units 3. The control units and the drive coils 6 or the movable permanent magnets PM could be supplied with energy via a suitable energy storage means, for example.

FIG. 5 schematically shows two transport units 3A, 3B in a plan view from above. The transport units 3A, 3B are configured identically here and each have a base body 9 having a substantially square base area. A coupling apparatus 11 is provided on each of the four sides of the transport units 3A, 3B. The coupling apparatuses 11 are purely mechanical here and configured in such a way that a relative movement between the coupled transport units 3A, 3B in the transport unit assembly TV (see FIG. 1a) is limited or blocked in all six degrees of freedom of movement. Transport units 3A, 3B can therefore be rigidly coupled to one another substantially directly so that the resulting transport unit assembly TV substantially behaves like a single transport unit of twice the size. The coupling apparatuses 11 here each have a coupling element 11a and a receiving unit 11b which are arranged at a specific distance from one another on the side faces of the base body 9. Depending on how rigid the coupling should be and how many degrees of freedom of movement should be limited, more or fewer coupling elements 11a and receiving units 11b could of course also be provided.

The coupling elements 11a are designed here as cylindrical bolts and corresponding cylindrical coupling openings 15 are provided as the receiving units 11b. Clamping elements 13 in the coupling openings 15 and clamping openings 12 in the coupling elements 11a, which are preloaded by means of preloading elements 14, are provided as the blocking apparatus, with the clamping elements 13 latching into corresponding clamping openings 12 for blocking. This is of course only an example and many other known blocking apparatuses could be provided. The blocking apparatus can be actuated passively here by the relative movement of the transport units 3A, 3B. The preloading elements 14 are designed here as springs and preload the clamping elements 13 in the direction of the axis of the cylindrical coupling opening 15. In the example shown, a clamping opening 12 in the form of a circumferential groove is provided on each coupling element 11a. Of course, a plurality of and/or other forms of clamping openings 12 could also be provided. The clamping elements 13 are designed here, for example, in the form of opposite balls. Of course, the reverse alternative embodiment would also be possible, i.e., one or more clamping elements 13 on the coupling elements 11a and one or more clamping openings 12 in the coupling openings 15. A mixed alternative embodiment having a clamping opening 12 and a clamping element 13 both on the coupling elements 11a and in the coupling openings 15 would also be conceivable.

To couple the two transport units 3A, 3B, they can be moved relative to one another in a transport plane TE so that the coupling element 11a of one transport unit 3A engages in the corresponding coupling openings 15 of the relevant other transport unit 3B. In the example shown, the clamping elements 13 are pressed radially outward by the coupling element 11a against the preloading force of the preloading elements 14. When a corresponding position is reached, the clamping elements 13, here the balls, latch into the clamping openings 12, here the circumferential grooves (which together form the blocking apparatus), as a result of which the coupling process and at the same time the blocking are completed. The two transport units 3A, 3B are now coupled directly to one another to form a transport unit assembly TV. The corresponding clamping elements 13 and clamping openings 12 (which together form the blocking apparatus) block the translational degree of freedom of movement in the X direction at least as long as the opposing force acting on the clamping elements 13 (e.g., driving or inertial forces) in the X direction is below a specific releasing force. The blocking apparatus can be released, for example, by exerting sufficiently large opposing forces, for example by generating driving forces on the transport units 3A, 3B in order to release the clamping elements 13 again from the clamping openings 12 against the preloading force of the preloading elements 14.

However, a suitable actuating unit (not shown in FIG. 5) could also be provided on the transport units 3A, 3B, for example, in order to actuate the blocking apparatus for blocking and/or releasing. Of course, a transport unit assembly TV does not necessarily have to be produced during the operation of the transport device 1 by moving the transport units 3A, 3B. The transport units 3A, 3B could, for example, also be coupled outside of the transport device 1, for example manually by a person, to form a transport unit assembly TV and then placed on the transport plane TE of the stator 2. Of course, the decoupling can also be carried out in the same way. However, in order to allow the most versatile process management of the transport device 1 possible, it is advantageous if the coupling/decoupling can be carried out automatically during operation.

A known bayonet mount could also be provided as a blocking apparatus, for example, as shown schematically in FIG. 6. An L-shaped clamping opening 12 is provided on the receiving unit 11b of the coupling apparatus 11 and a radially protruding clamping element 13 is provided on the corresponding coupling element 11a. To couple the coupling apparatus 11, an axial relative movement of the transport units 3A, 3B is first required, as indicated by the straight arrow. After the coupling, the coupling apparatus 11 can be blocked by the blocking apparatus by twisting the coupling element 11a and the receiving unit 11b relative to one another, as indicated by the curved arrow. It is irrelevant whether only the coupling element 11a is twisted, only the receiving unit 11b is twisted or both elements are twisted. To actuate the blocking apparatus, a suitable actuating unit can be provided on at least one of the two transport units 3A, 3B, for example. Additionally or alternatively, for example, a suitable preloading element (not shown) could also be provided for actuation or to support the actuation. In principle, however, two transport units 3A, 3B could also be coupled and blocked by means of a bayonet mount by way of a sequence of relative movements between the transport units 3A, 3B, for example by at least one transport unit 3A, 3B first performing a rotational relative movement about the X or Y axis relative to the relevant other transport unit 3A, 3B before coupling so that the clamping element 13 and the clamping opening 12 are aligned. A translational relative movement of the transport units 3A, 3B is then carried out (for example in the X direction) so that the clamping element 13 is inserted into the axial portion of the L-shaped clamping opening 12. When the clamping element 13 is aligned with the portion of the L-shaped clamping opening 12 extending in the circumferential direction, a relative rotational movement back into the starting position is finally carried out, as a result of which the coupling and the blocking process are completed. The blocking apparatus is released and the coupling apparatus 11 is decoupled by reversing the process. As a result, form-fitting coupling and blocking can be carried out simply and without external energy, as a result of which the transport unit assembly TV is not released undesirably even under relatively high axial forces.

As already mentioned, one or more actuators (not shown) can also be arranged on one or more transport units 3. For example, an electric actuator could be provided as an actuating unit in order to actuate the blocking apparatus. In this way, for example, the forces required for the coupling process could be reduced compared to the purely mechanical coupling apparatus 11 shown in FIG. 5. The actuator (or the plurality of actuators) could be supplied with energy via an energy storage means arranged on the relevant transport unit 3, for example a battery. However, an inductive transmission of energy from the stator 2 to the actuator would also be conceivable, as a result of which a separate energy storage means could be dispensed with.

However, a magnet group 4A, 4B of the transport unit 3 could also be used as an actuator for actuating the actuating unit. For this purpose, for example, at least one of the magnet groups 4A, 4B (or an additional magnet group, not shown) could be arranged on the transport unit 3 so that it can move relative to the other magnet groups. For example, a magnet group which can be shifted linearly or can be rotated relative to the other magnet groups would be conceivable. The movable magnet group is suitably connected to the actuating unit in order to carry out the movement required to actuate the relevant blocking apparatus and to generate the necessary actuating forces and/or moments. By activating the drive coils 6 accordingly, a relative movement between the movable magnet group and the other (fixed) magnet groups could consequently be generated, via which the actuating unit can be actuated. Alternatively or in addition to actuating the blocking apparatus, the actuator or actuators could also fulfill other functions. For example, a manipulation unit (not shown) for an object to be transported could be provided on a transport unit 3. A clamping apparatus for fixing the object to the transport unit 3 and/or a rotating apparatus for rotating the object relative to the transport unit 3 and/or a lifting apparatus for raising the object, etc. could be provided as a manipulation unit.

The manipulation unit could then in turn be driven by one or more actuators. The versatility of the transport device 1 can thus be increased even further, for example objects could be transferred from one transport unit 3 to another transport unit 3 by means of the manipulation unit. Objects could, for example, also be transferred, by means of the manipulation unit, from a transport unit 3 to a work station provided in the transport device 1, in which station a specific work step of a production process takes place, e.g., cleaning, assembling or processing the object. However, the object could also be brought from a transport position into a work position within the work station, for example by means of the manipulation unit, without passing the object. The object could then be moved within the work station by the transport unit 3 in the desired manner in order to carry out a specific work process.

FIG. 7 shows a plan view from above of two transport units 3A, 3B which are coupled to form a transport unit assembly TV. The transport units 3A, 3B each have a base body 9. The coupling apparatus 11 of the left-hand transport unit 3A has a receiving unit 11b and the coupling apparatus 11 of the right-hand transport unit 3B has a coupling element 11a. The coupling element 11a can, for example, in turn be designed as a cylindrical bolt and the receiving unit 11b can be designed as a corresponding cylindrical coupling opening 15 (similar to that in FIG. 5). Clamping elements 13 in the coupling openings 15 and clamping openings 12 in the coupling elements 11a interacting with said clamping elements are provided here in turn as the blocking apparatus, the clamping elements 13 latching into corresponding clamping openings 12 in order to block the coupling apparatuses 11.

The transport units 3A, 3B can be coupled here analogously to the example according to FIG. 5 by a relative movement. The coupling apparatuses 11 in the coupled state are also blocked here by relative movement by the clamping elements 13 engaging in the corresponding clamping openings 12. An external actuating unit is provided here for releasing the blocking apparatus. As shown, the external actuating unit can be arranged on a stationary structure 22 of the transport device 1. The stationary structure 22 can be part of the transport segment TSi, for example. The external actuating unit could, of course, also be arranged in a third transport unit (not shown). In this embodiment, an actuating opening 19 which connects the coupling opening 15 to a side face of the base body 9 of the transport unit 3A is provided on the left-hand transport unit 3A. A first sloping actuating surface 18, which is inclined at a specific angle about the vertical axis (here the Z axis) and faces the actuating opening 19 in the coupled state, is provided at the free end of the coupling element 11a. The actuating unit here has a cylindrical actuating rod 21 which can be inserted into the actuating opening 19 of the left-hand transport unit 3A in order to interact with the actuating surface 18 of the coupling element 11a of the right-hand transport unit 3B in order to release the blocking apparatus. A second sloping actuating surface, which is complementary to the first actuating surface 18 and simplifies the releasing process, can be provided at the free end of the actuating rod 21.

In order to release the blocking apparatus, the transport unit assembly TV can be moved in the transport plane TE relative to the actuating unit so that the actuating rod 21 is aligned with the actuating opening 19. The transport unit assembly TV can then be moved in the direction of the actuating unit (here in the Y direction) so that the actuating rod 21 presses on the first actuating surface 18 of the coupling element 11a, as a result of which the clamping elements 13 are pressed against the force of the preloading elements 14 out of the clamping openings 12 in the coupling elements 11a interacting with said clamping elements. The blocking apparatus is thus released and the transport units 3A, 3B can be decoupled from the transport unit assembly TV. Of course, the blocking apparatus could also be released manually by the first actuating surface 18 of the coupling element 11a being actuated through the actuating opening 19, for example using a suitable tool.

The coupling of a plurality of transport units 3 to form a transport unit assembly TV can also be used particularly advantageously to absorb process forces acting in a work station, for example externally acting process forces of a work process. For this purpose, for example, the transport unit assembly TV can first be formed from a specific number of (at least two) transport units 3, for example outside the work station (e.g., in the transport plane TE or manually). After that, the transport unit assembly TV can be moved in the transport plane TE into the region of the work station where a specific work process in which process forces act on the transport unit assembly TV is carried out. After the end of the work process, the transport unit assembly TV can be moved out of the region of the work station and decoupled into the individual transport units 3 again. If the transport unit assembly TV is formed from more than two transport units 3, only one (or more) of the transport units 3 can of course also be decoupled and the remaining transport units 3 can be moved further as a smaller transport unit assembly TV. By forming a transport unit assembly TV in the region of a work station, greater process forces can be absorbed since more drive magnets 4 are available than is the case when using just one transport unit.

Another advantage of a transport unit assembly TV is, for example, that greater accelerations can be achieved compared with a single transport unit 3 because a larger number of drive magnets 4 which can interact with a larger number of drive coils 6 at the same time to accelerate the transport unit assembly TV are available. In addition, torques (acceleration moments) resulting from the acceleration process can be better supported because the transport unit assembly TV has a larger geometric extent in comparison to a single transport unit 3. Acceleration moments are caused in particular by the distance in the Z direction between the center of gravity of the transport unit assembly TV and the drive magnets 4 at which the driving force acts on the transport unit assembly TV and can be at least partially compensated for by actuating moments being generated via the drive coils 6 which interact with drive magnets 4 of the transport unit assembly TV and are spaced apart from the center of gravity of the transport unit assembly TV in the X and/or Y direction (depending on the movement direction).

A further advantage of a coupled transport unit assembly TV is, for example, that, compared to an uncoupled transport unit assembly TV, the forces and moments in the coupled state are always transmitted via the coupling apparatus 11 and not via the transported object, which means that the object is not additionally loaded. Of course, the embodiments described so far with reference to FIG. 5-7 are only to be understood as examples and alternative structural designs, from which a person skilled in the art can select a suitable coupling apparatus 11, blocking apparatus or actuating unit according to a desired application, would also be conceivable. Of course, this also applies analogously to the embodiments according to FIG. 8-11, which are described in more detail below. Even if the coupling apparatuses 11 shown are provided on the side of the transport units 3, this is of course not to be understood as limiting. Alternatively or additionally, suitable coupling apparatuses 11 can, for example, be provided on the surfaces of the transport unit 3, for example on the upper side of the transport unit 3 opposite the drive magnet 4 and/or on the underside. Furthermore, coupling apparatuses 11 can also have magnetic elements for sole coupling or to support the coupling. Further embodiments are explained below by way of example with reference to FIG. 8-11.

In FIG. 8, two transport units 3A, 3B are shown in the upper region and a coupling apparatus 11 is arranged on each unit. In the lower region, the transport units 3A, 3B are shown in the coupled state as a transport unit assembly TV. The coupling apparatus 11 of the transport unit 3B has at least one coupling element 11a which is arranged on the upper side of the base body 9 opposite the drive magnets 4 and protrudes laterally on the left beyond the base body 9. Of course, this is only an example and a plurality of coupling elements 11a could also be provided. The coupling element 11a can be designed as desired, for example as a cylindrical bolt or as a rod having a rectangular cross section, etc. The coupling apparatus 11 of the other transport unit 3A has at least one receiving unit 11b here, which is also arranged on the upper side of the base body 9.

The coupling element 11a and the receiving unit 11b can be connected to each transport unit 3A, 3B in any way, for example glued or screwed, or they could also be integrated into the base body 9 of the transport unit 3A, 3B. In order to couple the transport units 3A, 3B to form the transport unit assembly TV, the receiving unit 11b is provided to receive the coupling element 11a of one of the transport units 3B. For this purpose, a coupling opening 15 can be provided, for example, into which the coupling element 11a can be inserted, preferably by a relative movement of the two transport units 3A, 3B. As soon as the coupling element 11a and the coupling opening 15 are aligned, only a movement in the X direction is required here for the coupling. In the example shown, the coupling element 11a is designed as a cylindrical bolt, as indicated by the hatched cross section in FIG. 8, and the coupling opening 15 is correspondingly designed as a cylindrical hole extending in the X direction within the receiving unit 11b.

In the transport unit assembly TV, the coupling limits a relative movement between the two transport units 3A, 3B in at least one degree of freedom of movement, here in the Y direction. However, due to the cylindrical design of the coupling element 11'a and the coupling opening 15, a certain rotational relative movement about a common coupling axis KA, which here extends in the X direction, can also be possible. Of course, a suitable blocking apparatus (not shown) could also be provided here in order to block the coupling element 11a in the receiving unit 11b in a frictional or form-fitting manner. The combination of one or more clamping element(s) 13 having preloading element(s) 14 and one or more corresponding clamping opening(s) 12 can be provided as a blocking apparatus, for example, as described in FIG. 5. An active blocking apparatus having an actuator as the actuating unit would of course also be conceivable. Of course, a plurality of coupling apparatuses 11 per transport unit 3A, 3B can also be provided here, as indicated by the dashed lines. Of course, each coupling apparatus 11 can also have a plurality of coupling elements 11a and/or a plurality of receiving units 11b.

An alternative embodiment of interacting coupling apparatuses 11 is shown in FIG. 9. Again, two separate transport units 3A, 3B are shown in the upper region and the transport units 3A, 3B are coupled to form a transport unit assembly TV in the lower region. At least one coupling opening 15 is provided directly in the base body 9 of the transport unit 3A as the receiving unit 11b. At least one coupling element 11'a, which corresponds to the at least one receiving unit 11b, is in turn arranged on the upper side of the base body 9 of the relevant other transport unit 3B. The shape of the coupling opening 15 can substantially be of any design. The shape of the coupling opening 15 is preferably selected depending on the desired degrees of freedom of movement of the transport units 3A, 3B in the coupled state in the transport unit assembly TV.

In the example shown, the coupling opening 15 is designed as a cylindrical hole which partially extends vertically (in the Z direction) into the base body 9. On the underside of the coupling element 11a, a cylindrical projection 16 is provided which partially extends vertically downward. While only a movement in the transport plane TE (in the X and Y direction) is required for coupling the transport units 3A, 3B in the embodiment according to FIG. 5 and FIG. 7a, a relative movement of the transport units 3A, 3B in the vertical axis normal to the transport plane TE of the stator 2 (here in the Z direction) is also required in the embodiment according to FIG. 9. For example, the transport unit 3A can be lowered relative to the transport unit 3B in the Z direction (and/or the transport unit 3B can be raised relative to the transport unit 3A), which can be carried out by means of the planar motor control unit 5 by activating the corresponding drive coils 6.

As a result, the air gap between the drive magnets 4 of the transport unit 3A and the stator 2 is reduced and/or the air gap between the drive magnets 4 of the transport unit 3B and the stator 2 is increased. After the transport units have been positioned by being moved in the transport plane TE (in the X and Y directions) so that the coupling opening 15 of the receiving unit 11b of the transport unit 3A and the projection 16 of the coupling element 11a of the transport unit 3B are aligned, the transport unit 3A can be raised again in the Z direction and/or the transport unit 38 can be lowered to complete the coupling. Similarly, rotations about the X. Y and Z axes can also be used for coupling or decoupling. In the example shown, the relative movement of the transport units 3A, 3B is completely limited in two translational degrees of freedom of movement (X, Y) and the third translational degree of freedom of movement (Z) is partially limited. In addition, two rotational degrees of freedom of movement (about the X and Y axes) are completely limited and the rotational degree of freedom of movement about the Z axis is at least partially limited, depending on the structural design of the coupling apparatus 11 and the shape of the transport units 3A, 3B.

Depending on the shape of the transport units 3A, 3B, however, there could be a certain relative movement of the transport units 3A, 3B about the vertical coupling axis KA, for example if one or both transport units 3A, 3B have a base body 9 having a round base area or if a certain distance is provided between the two base bodies 9 in the coupled state (this also applies to all other embodiments, of course). If the base bodies 9, as in FIG. 9, each have a rectangular base area and the transport units 3A, 3B directly abut one another in the coupled state, the rotational degree of freedom of movement about the Z axis (here coupling axis KA) is also limited. Of course, in the embodiment according to FIG. 9, a plurality of coupling apparatuses 11 can be provided in turn for each transport unit 3A, 3B and/or a coupling apparatus 11 could have a plurality of receiving units 11b and/or coupling elements 11a.

FIG. 10 shows a further embodiment of interacting coupling apparatuses 11. Again, two separate transport units 3A, 3B are shown in the upper region and the transport units 3A, 3B are coupled to form a transport unit assembly TV in the lower region. A coupling opening 15 is provided here directly in the base body 9 of the transport unit 3A as the receiving unit 11b. A coupling element 11a, which corresponds to the at least one receiving unit 11b for coupling, is in turn arranged on the side of the base body 9 of the other transport unit 3B in each case. The coupling opening 15 can, for example, be designed as a cylindrical hole or have another shape, for example in the form of a groove having a rectangular cross section. The coupling element 11a can be designed accordingly in order to interact with the coupling opening 15.

At least one clamping opening 12 is provided in the coupling element 11a as a blocking apparatus for blocking an additional degree of freedom of movement (here in the X direction) and at least one clamping element 13, which interacts with the clamping opening 12 to block the coupling apparatus 11, is provided in the coupling opening 15. The clamping element 13 is arranged so that it can be shifted in the Z direction in an opening provided for this purpose, as indicated by the double arrow. Of course, a plurality of clamping elements 13 and clamping openings 12 could also be provided. In this embodiment, the blocking apparatus is actuated for blocking by gravity and the blocking apparatus is magnetically actuated for releasing. An external actuating unit BE is provided for this purpose and can be arranged, for example, on a stationary structure 22 of the transport device 1, for example on the transport segment TSi. The actuating unit BE has a first actuating magnet 23a which can be designed as a permanent magnet or as an electromagnet. A second actuating magnet 23b, preferably a permanent magnet, which can interact with the first actuating magnet 23a in order to generate a magnetic force on the clamping element 13 in the vertical direction that lifts the clamping element 13, is arranged on the clamping element 13.

To block the blocking apparatus, for example, the transport unit 3A, on which the clamping element 13 is provided, can be moved to the stationary actuating unit BE so that the clamping element 13 is in the region below the actuating unit BE, as shown. The actuating magnets 23a, 23b interact in this position in order to raise the clamping element 13 vertically and hold it in the raised position. The transport unit 3B, on which the coupling element 11a is arranged, can then be moved relative to the relevant other transport unit 3A so that the transport units 3A, 3B are coupled to form a transport unit assembly TV by the coupling element 11a interacting with the corresponding coupling opening 15. In the coupled state, the coupling opening 12 is below the raised clamping element 13. In this position, the transport units 3A, 3B or the transport unit assembly TV could, for example, be moved simultaneously in one direction (e.g., the X direction and/or Y direction) in order to remove the second actuating magnet 23b of the clamping element 13 from the magnetic field of the first (stationary) actuating magnet 23a. If there is no longer sufficient magnetic force acting upward on the clamping element 13, the clamping element 13 is lowered into the clamping opening 12 and the coupling apparatus 11 is blocked. If necessary, a preloading element could also be arranged in the vertical direction between the clamping element 13 and the base body 9 of the transport unit 3A in order to accelerate or support the blocking. However, the preloading force should be selected so that it can be overcome by the magnetic force in any case.

If the first actuating magnet 23a of the actuating unit BE is designed as an electromagnet, the transport unit assembly TV could, for example, also remain in the region of the actuating unit BE and the electromagnet can be switched off. As a result, the magnetic force FM acting on the clamping element 13 is lifted so that the clamping element 13 is lowered vertically into the clamping opening 12 due to gravity (and optionally the additional preloading force) in order to block the coupling apparatus 11. To release the blocking apparatus, the procedure could be substantially reversed by the transport unit assembly TV being moved into the region of the actuating unit BE in order to raise the clamping element 13. The transport unit 3B, on which the coupling element 11a is arranged, could then be moved away from the transport unit 3A relative to the relevant other transport unit 3A.

In principle, however, the blocking apparatus could also be actuated for blocking purposes without an external magnetic force FM. For example, suitable interacting sloping contact surfaces could be provided on the clamping element 13 and/or on the coupling element 11a. For example, a suitable first chamfer 24a facing the open side of the clamping opening 15 could be arranged on the clamping element 13. A corresponding second chamfer 24b could be provided at the free end of the coupling element 11a. As a result, the blocking apparatus could only be blocked by the relative movement of the two transport units 3A, 3B. A relative movement in the X direction can generate a force in the X direction, by means of which the coupling element 11a acts on the clamping element 13. A lifting force acting on the clamping element in the vertical direction can be generated by means of the interacting chamfers 24a, 24b. The clamping element 13 can be raised to the level of the circumferential surface of the coupling element 11a by the lifting force and can latch into the clamping opening 12. A chamfer is not provided here on the side of the clamping element 13 facing the inner end of the coupling opening 15. The blocking apparatus can thus be released again, for example, via the external actuating unit BE and the magnetic force FM.

By way of example, a further embodiment of the invention is shown in FIG. 11a-11c. FIG. 11a shows two transport units 3A, 3B in a plan view from above. As before, the transport units 3A, 3B each have a base body 9 having a rectangular base area. Coupling apparatuses 11 are provided on each of the four sides of the transport units 3A, 3B. The coupling apparatuses 11 here have magnetic elements 17a, 17b having different magnetization, as indicated by the hatched and non-hatched areas. To couple the transport units 3A, 3B, they are preferably moved relative to one another until a sufficiently small distance is produced between the magnetic elements 17a, 17b so that the magnetic elements 17a, 17b interact. The magnetic elements 17a, 17b then generate a mutually directed force of attraction, as a result of which the transport units 3A, 3B are coupled purely magnetically to form a transport unit assembly TV. In this case, the coupling is thus carried out substantially in a purely frictional manner by means of the magnetic force or by means of the frictional force which is dependent thereon.

A possible transport unit assembly TV is shown in FIG. 11b. Since only one magnetic element 17a, 17b is provided in each of the interacting coupling apparatuses 11, a transport unit assembly TV having a certain offset of the transport units 3A, 3B (here in the Y direction) can also be possible, a substantially stepless relative positioning in the Y direction being possible. As a result, a coupling with a third transport unit 3C would also be possible, for example, as indicated by the dashed lines. In order to decouple the transport unit assembly TV again, opposing driving forces (here in the X direction) could be generated by the stator 2, for example, which exceed the magnetic force of attraction. However, decoupling would also be possible by means of a shearing movement by the transport units 3A, 3B being moved tangentially in opposite directions, here in the Y direction.

FIG. 11c shows a further example of a transport unit assembly TV made up of two transport units 3A, 3B which are magnetically coupled to one another. The coupling apparatuses 11 of the transport units 3A, 3B here each have a plurality of magnetic elements 17a, 17b which are arranged next to one another and have different magnetization. For coupling, the magnetic elements 17a of the coupling apparatus 11 of the transport unit 3A interact with the magnetic elements 17b of the coupling apparatus 11 of the other transport unit 3B in order to generate a magnetic force of attraction (here in the X direction). Due to the fact that two opposite magnetic elements 17b, 17b which are magnetized in the same way repel one another and attract opposite magnetic elements 17a, 17b which are magnetized differently, a type of locking of the transport units 3A, 3B in a specific position relative to one another can be achieved.

In the example shown, four magnetic elements 17a, 17b are arranged alternately next to one another in the coupling apparatuses 11 of the transport units 3A, 3B. In the transport unit assembly TV, all four magnetic elements 17a, b of the coupling apparatus 11 of the left-hand transport unit 3A interact with all four magnetic elements 17a, b of the coupling apparatus 11 of the right-hand transport unit 3B. An offset coupling analogous to that in the transport unit assembly TV according to FIG. 11b would also be possible. In contrast to the alternative embodiment having only one magnetic element 17a, 17b per coupling apparatus 11 (FIGS. 11a and 11b), the offset (here in the Y direction) between the two transport units 3A, 3B is not steplessly adjustable.

The offset here is substantially dependent on the number, the arrangement and the width of the magnetic elements 17a, 17b. In the transport unit assembly TV shown according to FIG. 11c, an offset upward or downward by two magnet widths b would be possible, for example. In this case, however, only two magnetic elements 17a, 17b of the left-hand transport unit 3A would interact with two magnetic elements 17b of the right-hand transport unit and the relevant other magnetic elements 17a, 17b would remain free. These could of course in turn be used for coupling to a third transport unit (not shown), etc. It can be seen from this that many different magnetic coupling apparatuses 11 can be provided. In this embodiment, too, a shearing movement can advantageously be carried out for decoupling the transport unit assembly TV.

Of course, a coupling apparatus 11 can also have a combination of mechanical coupling and magnetic coupling. It would be conceivable, for example, for a mechanical coupling apparatus 11 to be provided with additional magnetic elements to support the coupling process. For example, the coupling elements 11a and receiving units 11b could be magnetized differently in order to produce a magnetic guide which allows easier intermeshing. In the embodiment according to FIG. 9, for example, the region of the coupling opening 15 on the transport unit 3A and the projection 16 of the coupling element 11a of the transport unit 3B could be magnetized differently. A separate figure is omitted at this point.

As already mentioned, more than two transport units 3 can of course also be coupled by means of coupling apparatuses 11 in order to obtain a larger transport unit assembly TV, as shown in FIG. 12a-12f. In FIG. 12a-12f, a plurality of transport units 3 are coupled to form a transport unit assembly TV. The coupling apparatuses 11 are only indicated schematically and can substantially be designed in any way. For example, a purely mechanical design, a purely magnetic design or a mixed form would be conceivable, as has already been explained. The force transmission between the transport units 3 in turn is carried out in each case via the corresponding coupling apparatuses 11.

FIG. 12a shows two transport units 3A, 3B which are coupled by means of the coupling apparatuses 11 to form a transport unit assembly TV, analogously to that already shown in FIG. 1a. Since coupling apparatuses 11 are provided on all four sides of the transport units 3A, 3B, coupling to any other side would of course also be possible. In FIG. 12b, four transport units 3A-3D having a square base area are coupled to form a transport unit assembly TV so that there is substantially a single large square transport unit. In this way, for example, a relatively large object O can be transported that would jut out over a single transport unit 3A-3D in the X and Y directions, as indicated in FIG. 12b. However, the transport unit assembly TV can also be advantageous if relatively heavy objects O are to be transported that exceed the maximum carrying capacity of one (or more) transport units 3A-3D. The transport unit assembly TV could be moved in the transport plane TE (not shown), for example, by using only the drive magnets 4 of one of the four transport units 3A-3D in order to interact with the drive coils 6 of the stator 2.

If a larger driving force is required, a plurality or all of the drive magnets 4 of all of the transport units 3A-3D of the transport unit assembly TV can of course also be used. For example, it would also be conceivable that, in the example according to FIG. 12b, only the drive coils 6 which are associated with the centrally adjacent drive magnets 4 in the transport assembly TV are used to generate the driving force, but all available drive coils 6 are advantageously used for efficient operation. FIG. 12d shows an alternative option for coupling four transport units 3A-3D to form a T-shaped transport unit assembly TV. FIGS. 12c and 12f show two alternative embodiments of a transport unit assembly TV having three coupled transport units 3A-3C.

The transport unit assembly TV in FIG. 12c can be advantageous, for example, in order to transport an object O having an uneven mass distribution, as shown by the object O shown having an eccentric center of gravity S. The two transport units 3A, 3C can be coupled here to support the transport unit 3B in order to be able to better support moments that result from the eccentric center of gravity S. A relatively small object O having a relatively large mass is shown in FIG. 12f. With regard to the geometric extent of the object O, the central transport unit 39 would be sufficient. However, the mass of the object O could, for example, exceed the maximum carrying capacity of the transport unit 39 (or require an inadmissibly high current to activate the drive coils 6) so that support from two additional transport units 3A, 39 in the transport unit assembly TV shown can be advantageous. For the sake of completeness, FIG. 12e also shows a transport unit assembly TV having six transport units 3A-3F which can be used for transporting a long, narrow object O, for example. From this, it can be seen that many other sizes and shapes of a transport unit assembly TV can also be formed in an obvious manner, with the specific design of the transport unit assembly TV being able to vary depending on the field of application.

FIG. 13 shows a transport device 1 which is used in a bottling system in order to transport bottles 25L, 25V between individual work stations ASi of the filling process. Of course, this is only to be understood as an example in order to explain the invention on the basis of an advantageous field of application. The transport device 1 could of course also be used for any other transport process. A plurality of transport segments TS1-TS7 which are adjacent to one another and jointly form a transport plane TE are provided in the transport device 1. Here, three transport units 3A-3C which can be moved at least two-dimensionally in the X direction and Y direction in the transport plane TE are provided in the transport device 1. Two opposite coupling apparatuses 11 are arranged here on the transport units 3A-3C. The coupling apparatuses 11 can substantially be of any design, for example purely mechanical, purely magnetic or a combination, as has already been described in detail. A blocking apparatus for blocking the coupling apparatuses 11 in the coupled state could of course also be provided.

A control unit for controlling the movement of the transport units 3A-3C is also provided in the transport device. For example, each transport segment TSi could also be associated with its own segment control unit, with the segment control units being able to communicate with a higher-level transport device control unit in order to exchange control commands. The transport device control unit could in turn be connected to a system control unit of the filling system, for example, in order to coordinate the filling process and the movement process of the transport units 3A-3C. The transport units 3A-3C are shown in various stages of the transport process, as will be explained below.

In a first step S1, a first transport unit 3A on the first transport segment TS1 is moved from a starting region SB into a working region of a first work station AS1. The work station AS1 is designed here as a stationary transfer station for transferring empty bottles 25L to the transport unit 3A. The empty bottles 25L can, for example, be moved from a collection station (not shown) to a transfer position UB of the transfer station and transferred, in the transfer position UB, to the transport unit 3A by means of a suitable manipulation unit. However, the specific design of the transfer station is irrelevant and it could be designed, for example, as a known industrial robot, as a transport device in the form of a long-stator linear motor or as a continuous conveyor. In the example shown, the transfer station is arranged in the Z direction above the transport plane TE so that the empty bottles 25L in the transfer position UB can be placed from above onto the transport unit 3A in a second step S2. Only one empty bottle 25L is handed over here in each case, but of course a plurality of bottles 25L could also be handed over if the capacity of the transport unit 3A allows it.

In a third step S3, the first transport unit 3A, which is now loaded with an empty bottle 25L, is moved onto the adjacent second transport segment TS2 into a coupling region KB. Of course, the sequence of movement preferably takes place in such a way that no inadmissibly high accelerations occur that would lead to the bottle 25L tipping over. In a fourth step S4, the first transport unit 3A is coupled to a second transport unit 3B and to a third transport unit 3C in the coupling region KB to form a transport unit assembly TV. The coupling can be carried out, for example, when the first transport unit 3A is at a standstill but could also take place during the movement by the movement sequences of the three transport units 3A-3C being coordinated with one another. The coupling does not have to take place simultaneously either, but the second or third transport unit 3B, 3C could be coupled to the first transport unit 3A first and then to the other transport unit 3B, 3C. Due to the coupling to form a transport unit assembly TV, a greater electromagnetic force can now be generated on the transport unit assembly TV than when using a single transport unit 3A because a larger number of drive magnets 4 is available that can therefore interact with a larger number of drive coils 6 of the planar motor.

In a fifth step S5, the transport unit assembly TV is moved into a working region of the second work station AS2. The movement can be carried out, for example, by activating the drive coils 6 of the second transport segment TS2 in order to interact with the drive magnets 4 of all the transport units 3A-3C or only some of the drive magnets 4. The second work station AS2 is designed here as a stationary filling station where the empty bottle 25L transported with the transport unit assembly TV is filled with a liquid in the region of a filling position FP in a sixth step S6, as indicated by the hatching. Here, the filling station is again arranged above the transport plane TE. In principle, it would of course also be conceivable for the filling station or, in general, the work stations ASi to be designed to be movable so that a work process can be carried out while the transport unit assembly TV or a transport unit 3 is moving. For example, in the example shown, the filling station could be moved in the X direction at the same speed as the transport unit assembly TV so that the filling process is carried out while the transport unit assembly TV is moving.

Filling the empty surface 25L increases the mass and thus the weight force (consisting of the weight force of the transport unit assembly TV itself and the weight force of the full bottle 25V) acting on the transport unit assembly TV, Due to the transport unit assembly TV, however, a greater levitation force can now be generated in the Z direction than when using a single transport unit 3A. The weight of the full bottle 25V could therefore also be higher, for example, than the maximum load capacity of an individual transport unit 3A because an additional levitation force can be generated by the coupled transport units 3B, 3C. Of course, other or additional process forces could also act on the transport unit assembly TV. The process force is generally to be understood as an additional load on the transport unit assembly TV, i.e., not only the weight force but also other forces or moments that act on the transport unit assembly TV in a work process. Furthermore, due to the transport unit assembly TV, a greater driving force can now be generated in the X or Y direction than when using a single transport unit 3A. In this way, for example, higher accelerations can be achieved and thus a more dynamic process management can be achieved.

In a seventh step S7, the transport unit assembly TV, with the full bottle 25V transported with it, is moved into an unloading region EB on the third transport segment TS3. In the unloading region EB, the full bottle 25V is detected in an eighth step S8 by a suitable manipulation apparatus 26, for example an industrial robot, and removed from the transport unit assembly TV. The transport process is thus completed and the transport unit assembly TV can be decoupled again since the load from the full bottle 25V is no longer there. The individual transport units 3A-3C can therefore be moved back into specific starting positions, for example. The first transport unit 3A could, for example, be moved back into the starting region SB on the first transport segment TS1 while, for example, a subsequent transport and filling process is already being carried out. A further transport segment TS8 could also be provided for this purpose, for example, as indicated by the dashed lines. The second transport unit 3B could, for example, be moved back into the coupling region KB via the fourth and fifth transport segment TS4, TS6 in order to be coupled to a subsequent first transport unit 3A, as symbolized by the arrow and the dashed transport unit 3B. Similarly, the third transport unit 3C could be moved back into the coupling region KB via the sixth and seventh transport segment TS6, TS7, for example.

The manipulation apparatus 26 can move the full bottles 25V which were removed from the transport unit assembly TV, for example, onto another transport device 27. By means of the transport device 27, the full bottles 25V can be moved, for example, into a collection region or to a downstream process station, for example a closure station, in which the full bottles 25V are closed. The transport device 27 can of course in turn be designed as a transport device 1 according to the invention or as a transport device in the form of a long-stator linear motor, continuous conveyor, industrial robot, etc.

The second alternative embodiment of the invention mentioned, according to which a transport unit 3A can be coupled to an object carrier OT (as a coupling unit 50), is described in more detail below with reference to FIG. 14a-17b. The basic structure and function of the transport device are unchanged, which is why a new description is not necessary at this point. The structure of the transport device can, for example, correspond to the structure according to FIGS. 1a and 1 b. FIG. 14a shows a side view of a transport unit 3A and an object carrier OT. FIG. 14b shows a plan view of the transport unit 3A (without the object carrier OT). Section A-A in FIG. 14a corresponds to the section line in FIG. 14b. Any object O that can be moved with the transport unit 3A in the transport plane TE (shown only schematically) of the transport device can be arranged on the object carrier OT. The transport unit 3A can have, for example, a base body 9, on the underside of which drive magnets 4 are arranged, as has already been described in detail with reference to FIG. 4a-4c. At least one coupling apparatus 11 is provided on the transport unit 3A and on the object carrier OT in each case. A relative movement between the transport unit 3A and the object carrier OT allows the transport unit 3A to be coupled to the object carrier OT to form an object carrier assembly OV. After coupling, the object carrier assembly OV can be moved in the transport plane TE in a conventional manner by actuating the drive coils or the movable permanent magnets of the stator. For easier recognition, the object carrier OT and the transport unit 3A are shown in FIG. 14a in the uncoupled state.

In the context of the invention, relative movement is understood to mean a movement of the transport unit 3A relative to the stationary object carrier OT, a movement of the object carrier OT relative to the stationary transport unit 3A or a movement of the transport unit 3A and the object carrier OT relative to one another. The possibility of moving the transport unit 3A substantially depends on the structural design of the transport device 1, in particular on the arrangement of the drive magnets 4 on the transport unit 3A and on the arrangement of the drive coils or the movable permanent magnets on the stator. The movement in the transport plane TE is generally understood to mean a movement in at least two, and up to six, degrees of freedom of movement. In the example shown, the transport unit 3A can be moved two-dimensionally in translation in the X-Y plane in a substantially unlimited manner and in a limited manner in the Z direction. Substantially unlimited rotational movement about the Z axis is possible and limited rotational tilting movement about the X axis and about the Y axis is possible.

For example, the object carrier OT can be releasably held on a stationary holder (not shown) of the transport device 1 that can be arranged at a suitable point which can be reached by the transport unit 3A. The transport unit 3A can then be moved first to the object carrier OT in the transport plane TE. When the transport unit 3A is in the region of the object carrier OT, the coupling apparatus 11 of the transport unit 3A can be made to coincide with the coupling apparatus 11 of the object carrier OT. Then, the transport unit 3A can be coupled to the object carrier OT purely by the relative movement, with the object carrier OT being released from the holder. The object carrier assembly OV can now be moved in the transport plane TE by appropriate control of the transport unit 3A in order to carry out a desired transport process. Of course, the reverse alternative embodiment would also be possible, in which the transport unit 3A stands still and the object carrier OT is moved relative to the transport unit 3A, for example by means of a suitable manipulation apparatus such as a robot. However, the coupling process remains unchanged.

In the example according to FIGS. 14a and 14b, the coupling apparatus 11 of the object carrier OT has a coupling element 11a and the coupling apparatus 11 of the transport unit 3A has a receiving unit 11b which corresponds to said coupling element. The coupling element 11a is arranged here on the underside of the object carrier OT facing the transport unit 3A and has a projecting portion 28 adjacent to the underside and a free end 29 which is wider than the projecting portion 28. The free end 29 has a rectangular cross section here, for example. However, the free end 29 and/or the projecting portion 28 could also be cylindrical, for example, with the projecting portion 28 having a smaller diameter than the free end 29. The wider free end 29 can be regarded as part of a blocking apparatus within the meaning of the invention, in particular as a clamping element.

The receiving unit 11b is arranged on the upper side of the base body 9 of the transport unit 3A opposite the drive magnet 4. The receiving unit 11b here has a receiving opening 30 which has a rectangular cross section and extends from the upper side over part of the base body 9 in the direction of the underside. Of course, the receiving opening 30 could also have a different shape, for example a round cross section. Adjacent to one side of the receiving opening 30 is a guide channel 31 which is open at the top and extends substantially in a Z shape here, as well as a receiving channel 32 below the guide channel 31 in the Z direction. The guide channel 31 and the receiving channel 32 can be regarded as part of the blocking apparatus within the meaning of the invention, in particular as a clamping opening. The width of the guide channel 31 substantially corresponds to the width of the projecting portion 28 of the coupling element 11a of the object carrier OT or is slightly larger and the width of the receiving channel 32 substantially corresponds to the width of the free end 29 of the coupling element 11a of the object carrier OT or is slightly larger.

The object carrier OT and the transport unit 3A can be coupled to form an object carrier assembly OV by a relative movement between the object carrier OT and the transport unit 3A. For this purpose, the object carrier OT and the transport unit 3A are first positioned relative to one another in the X-Y plane in such a way that the coupling element 11a and the receiving unit 11b are aligned. A relative movement is then carried out in the Z direction until the coupling element 11a is received in the receiving unit 11b. This completes the coupling within the meaning of the invention, in which at least one degree of freedom of the relative movement between the object carrier OT and transport unit 3A is limited (here two translational degrees of freedom in the X and Y directions and one rotational degree of freedom about the Z axis). The blocking apparatus can also be actuated here by the relative movement, here first in the X direction, so that the projecting portion 28 of the coupling element 11a is received in the guide channel 31 and the free end 29 of the coupling element 11a is received in the receiving channel 32. This limits a further degree of freedom of the relative movement, here in the Z direction. A further relative movement, which substantially depends on the course of the guide channel 31 and the parallel receiving channel 32, can then be carried out. In the example shown, this relative movement is made up of the Z-shaped course from the aforementioned relative movement in the X direction, a subsequent relative movement in the Y direction and a further relative movement in the X direction, until the projecting portion is in the region of the closed end of the guide channel 31.

Of course, the structural embodiment shown is only to be understood as an example and the components could of course also have a different structural design. For example, the coupling element 11a and the receiving unit 11b could have a different shape and the guide channel 31 and receiving channel 32 could have a different course. Of course, the coupling apparatus 11 of the object carrier OT could also have a plurality of identical coupling elements 11a and the coupling apparatus 11 of the transport unit 3A could have a plurality of receiving units 11b of the same type. It would also be conceivable, for example, for additional magnetic elements (not shown) to be provided to support the coupling process. For example, the coupling element 11a and the receiving unit 11b could be magnetized differently in order to produce a magnetic guide which allows easier intermeshing. For example, a magnetic element could also be provided only in the region of the end of the receiving channel 32, which magnetic element interacts magnetically with the coupling element 11a in order to generate a holding force.

The example according to FIGS. 15a and 15b differs from the embodiment according to FIGS. 14a and 14b only by way of the design of the coupling element 11a of the receiving unit 11b corresponding thereto. The coupling element 11a is here in turn arranged on the underside of the object carrier OT facing the transport unit 3A and has a cylindrical projection 33 adjacent to the underside and a radially projecting pin 34 arranged on the circumferential surface. The pin 34 can also be cylindrical, for example. The pin 34 is spaced apart at least from the underside of the object carrier OT in the Z direction. Here, the pin 34 is arranged substantially centrally on the projection 33 in the Z direction but could also be further down. The pin 34 can be regarded as part of the blocking apparatus within the meaning of the invention, in particular as a clamping element. The receiving unit 11b here has a cylindrical receiving opening 35 which extends from the upper side over part of the base body 9 in the direction of the underside. The diameter of the receiving opening 35 substantially corresponds to the diameter of the cylindrical projection 33 or is slightly larger. On one side of the receiving opening 30, seen here at the top in the Y direction, a vertical slot 36 which extends radially outward is provided. The vertical slot 36 extends, as seen in the Z direction, from the upper side of the base body 9 over a part of the depth of the receiving opening 35, the part substantially corresponding to the distance between the underside of the pin 34 and the underside of the object carrier OT. Seen in the circumferential direction, the slot 36 is connected to a guide channel 37 which substantially has the shape of a circular ring sector. The guide channel 37 is connected in the radial direction to the receiving opening 35 and is spaced apart from the upper side of the base body 9, as can be seen in FIG. 15a. Starting from the slot 36, the guide channel extends over a specific angle in the circumferential direction, here for example 90°. The slot 36 and the guide channel 37 thus form part of the blocking apparatus within the meaning of the invention, in particular the clamping opening.

Again, the object carrier OT and the transport unit 3A can be coupled by a relative movement. For this purpose, the object carrier OT and the transport unit 3A are first positioned relative to one another in the X-Y plane in such a way that the coupling element 11a and the receiving unit 11b are aligned. In the example shown, this means that the cylindrical projection 33 is aligned with the receiving opening 35 and the pin 34 is aligned with the slot 36. A relative movement is then carried out in the Z direction until the coupling element 11a is received in the receiving unit 11b. As a result, the coupling is completed since at least one degree of freedom of the relative movement is limited (here two translational degrees of freedom in the X and Y directions, as well as one rotational degree of freedom about the Z axis, and additionally, due to the cylindrical form fit, the rotations about the X and Y axis are blocked). Thereafter, the blocking apparatus can take place by a relative rotary movement about the Z axis so that the pin 34 of the coupling element 11a is received in the guide channel 37. This limits a further degree of freedom of the relative movement, here in the Z direction. Of course, the design embodiment shown in FIGS. 15a and b is again only to be understood as an example and the components could of course also be designed to be structurally different. Again, a magnetic support could also be provided, as has already been mentioned above for FIGS. 14a and b.

Another possible embodiment of the coupling of the object carrier OT and transport unit 3A is shown in FIGS. 16a and 16b. The coupling apparatus 11 of the object carrier OT here has four coupling elements 11a which are arranged on the underside of the object carrier OT, and the transport unit 3A has four corresponding receiving units 11b on the upper side of the base body 9. The coupling elements 11a each have a cuboid projection 38 and the receiving units 11b have cuboid recesses 39, the size of which substantially corresponds to the projections 38 or is slightly larger. In the example shown, a receiving opening 38a is provided in each of the projections 38, which opening can be regarded as part of a blocking apparatus within the meaning of the invention, in particular as a clamping opening. The receiving opening 38a is designed here, for example, as a cylindrical through-hole extending in the Y direction. A first blocking channel 40a and a second blocking channel 40b are provided on each cuboid recess 39 here. One end of the first blocking channel 40a is connected to the cuboid recess 39 and the other end is closed. The first blocking channel 40a extends (in the coupled state) in parallel with the receiving opening 38a of the projection 38, here in the Y direction. The second blocking channel 40b is connected to the first blocking channel 40a by one end and the other end is closed. The longitudinal axes of the blocking channels 40a, 40b intersect and are arranged at a fixed angle to one another, here at 90°. The second blocking channel 40b therefore extends in the X direction. A first blocking element 41a is arranged in the first blocking channel 40a and is movable within the first blocking channel 40a in the direction of the longitudinal axis. A second blocking element 41b, which is movable within the second blocking channel 40b in the direction of the longitudinal axis, is arranged analogously in the second blocking channel 40b. The first blocking element 41a can be regarded as a clamping element of the blocking apparatus within the meaning of the invention.

Again, the object carrier OT and the transport unit 3A can be coupled by a relative movement. First, the object carrier OT and the transport unit 3A are positioned relative to one another in the X-Y plane in such a way that the coupling elements 11a and the receiving units 11b are aligned. In the example shown, this means that the cuboid projections 38 are aligned with the cuboid recesses 39. The first blocking elements 41a are preferably completely inside the first blocking channel 40a, as is shown at the top left in FIG. 16b as a representative for all four receiving units 11b. A relative movement is then carried out in the Z direction until the projections 38 are received in the recesses 39. As a result, the coupling process within the meaning of the invention is completed since at least one degree of freedom of the relative movement is limited (here two translational degrees of freedom in the X and Y directions, as well as one rotational degree of freedom about the Z axis, and additionally, due to the form fit, the rotations about the X and Y axis are blocked). Then, the blocking apparatus can be activated again by a relative movement. It should be noted here that the blocking elements 41a, 41b of the four coupling apparatuses 11 in FIG. 16b are shown in different temporal stages of the blocking process (top left, top right, bottom left and bottom right). To actuate the blocking apparatus, the object carrier assembly OV is first tilted about the X axis from the horizontal unto the first blocking elements 41a are partially received in the receiving opening 38a of the associated projection 38, as is shown at the top right in FIG. 16b as a representative for all four receiving units 11b. The blocking elements are moved due to gravity, but they can also be moved additionally or alternatively due to mass inertia forces. As a result, another degree of freedom of the relative movement is limited, here in a form-fitting manner in the Z direction. The object carrier assembly OV can then be tilted around the Y axis (additionally or after it has been tilted back to the horizontal) until the second blocking elements 41b are partially received in the first blocking channel 40a, as is shown at the bottom left in FIG. 16b as a representative of all four receiving units 11b. The second blocking elements 41b thus act as a safeguard for the first blocking elements 41a so that they do not move out of the receiving openings 38a in an undesired manner. Unblocking can be carried out in the reverse order of the movement sequences, i.e., first tilting around the Y axis so that the second blocking elements 41b release the first blocking elements 41a (FIG. 16b-bottom right) and then tilting around the X axis so that the first blocking elements 41a release the receiving openings 38a. Of course, the design embodiment shown in FIGS. 16a and b is only to be understood as an example, and the components could of course also have a different structural design. Again, a magnetic support could also be provided, as has already been mentioned above for FIGS. 14a and b.

Another possible embodiment of the coupling of the object carrier OT and transport unit 3A is shown in FIGS. 17a and 17b. The coupling apparatus 11 of the object carrier OT has two coupling elements 11a here, for example, which are arranged on the underside of the object carrier OT, and the transport unit 3A has two receiving units 11b corresponding thereto on the upper side of the base body 9. Analogously to the example according to FIG. 16a, the coupling elements 11a each have a cuboid projection 42 having a receiving opening 42a which forms part of a blocking apparatus, in particular the clamping opening. The receiving units 11b have cuboid recesses 43, analogously to the example according to FIG. 16b. A blocking channel 44 is provided on each cuboid recess 43. One end of the blocking channel 44 is connected to the cuboid recess 43 and the other end is preferably closed. The blocking channel 44 extends (in the coupled state) in parallel with the receiving opening 42a of the projection 42, here in the Y direction. A magnetic blocking element 46 is arranged in the blocking channel 44, is movable within the blocking channel in the direction of the longitudinal axis and is pressed by a spring element in the direction of the recess 43, as shown on the right in FIG. 17b. The blocking channel 44, the blocking element 46 and the spring 45 thus form part of the blocking apparatus within the meaning of the invention, with it being possible for the blocking element 46 in particular to be considered as a clamping element within the meaning of the invention. In the non-actuated state, the blocking element 46 is in the blocking state shown on the right. In order to actuate the blocking apparatus, an actuating unit BE is required in this example, similar to what has already been explained with reference to the example in FIG. 10. The actuating unit BE can, for example, be part of the transport device 1, as shown in FIG. 17b, but could of course also be part of the transport unit 3k In the example shown, a magnetic actuating portion 47 is provided on the actuating unit BE, for example a permanent magnet or electromagnet. However, the actuating unit BE can also be designed differently, for example having a mechanical actuation.

In order to couple the object carrier OT to the transport unit 3A, the transport unit 3A can first be moved into an actuating region of the actuating unit BE where a magnetic force FM is generated on the blocking element 46, by means of which the blocking element 46 can be moved from the blocked position (FIG. 17b—on the right) into a release position (FIG. 17b—on the left). Then, the object carrier can be coupled to the transport unit 3A by a relative movement. The object carrier OT and the transport unit 3A are positioned relative to one another in the X-Y plane in such a way that the coupling elements 11a and the receiving units 11b are aligned. In the example shown, this means that the cuboid projections 42 are aligned with the cuboid recesses 43. A relative movement is then carried out in the Z direction until the projections 42 are received in the recesses 43. As a result, the coupling process within the meaning of the invention is completed since at least one degree of freedom of the relative movement is limited (here two translational degrees of freedom in the X and Y directions, as well as one rotational degree of freedom about the Z axis, and additionally, due to the form fit, the rotations about the X and Y axis are blocked).

The blocking apparatus can then be actuated by moving the object carrier assembly OV out of the actuating region of the actuating unit. Due to the lack of magnetic force FM, the blocking element 46 is moved back into the blocking state (FIG. 17b—on the right) by the spring element 45. The blocking element 46 is now received in the receiving opening 42a, as a result of which a further degree of freedom of the relative movement is limited, here in a form-fitting manner in the Z direction. Unblocking can be carried out in the reverse order of the movement sequences, i.e., first moving into the actuating region of the actuating unit BE and then decoupling the object carrier OT from the transport unit 3A. Of course, the design embodiment shown in FIGS. 17a and b is only to be understood as an example, and the components could of course also have a different structural design and more or fewer coupling elements 11a and receiving units 11b could also be provided. Similarly to the example according to FIG. 10, corresponding chamfers (not shown) could of course also be arranged on the blocking element 46 and on the projection 42 so that the blocking element 46 is automatically shifted from the blocking state into the release state by the relative movement during the coupling process. In this case, actuation by the actuating unit BE would only be required for unblocking.

It can be seen that a very versatile transport process can be carried out by the transport device 1 according to the invention, in which any objects can be transported in a very versatile manner. By coupling a plurality of transport units 3 to form a transport unit assembly TV according to the first alternative embodiment of the invention, the transport process can advantageously be adapted to the size and weight of the transported objects in order to be able to carry out a transport process with a desired movement sequence. The coupling of a transport unit 3 to an object carrier OT according to the second alternative embodiment of the invention has the advantage that coupling/decoupling of a transport unit 3 to/from an object carrier OT is made possible in a simple manner so that, for example, different object carriers OT can be exchanged easily and quickly.

The invention claimed is:

1. A transport unit for a transport device in the form of a planar motor having at least one transport segment which forms a transport plane, drive magnets being provided on the transport unit to interact magnetically with drive coils or movable permanent magnets of the transport segment, or drive coils or movable permanent magnets being provided on the transport unit to interact magnetically with drive magnets of the transport segment in order to move the transport unit at least two-dimensionally in the transport plane, wherein at least one coupling apparatus is provided on the transport unit, which apparatus is designed to releasably couple the transport unit to a coupling unit to form an assembly by way of a relative movement between the transport unit and the coupling unit in the transport plane, the coupling apparatus being designed to interact with the coupling unit in the coupled assembly, wherein a relative movement between the transport unit and the coupling unit is limited in at least one degree of freedom of movement, the coupling unit either being a further transport unit and it being possible for the at least two transport units to be coupled by the coupling apparatuses to form a transport unit assembly in which the transport units can be jointly moved in the transport plane, or wherein the coupling unit is an object carrier for receiving an object and the transport unit can be coupled to the object carrier to form an object carrier assembly in which the object carrier can be moved in the transport plane by the transport unit.

2. The transport unit according to claim 1, wherein the coupling apparatus is designed to be form-fitting and/or frictional.

3. The transport unit according to claim 1, wherein the coupling apparatus has at least part of a blocking apparatus which is designed to limit a relative movement between the transport unit and the coupling unit in the assembly in an additional degree of freedom of movement.

4. The transport unit according to claim 3, wherein the blocking apparatus can be actuated by a relative movement between the transport unit and the coupling unit or by an external actuating unit, or wherein an actuating unit for actuating the blocking apparatus and an actuator for actuating the actuating unit are provided on the transport unit or the coupling unit.

5. The transport unit according to claim 1, wherein at least one coupling element and/or at least one receiving unit is provided in the coupling apparatus, a coupling element being provided to interact with a receiving unit of the coupling unit for coupling.

6. The transport unit according to claim 5, wherein at least one clamping opening and/or at least one clamping element is preferably provided as part of the blocking apparatus on at least one coupling element and/or on at least one receiving unit.

7. The transport unit according claim 1, wherein at least one magnetic element is provided in the coupling apparatus.

8. The transport device in the form of a planar motor having at least one transport segment which forms a transport plane and having at least one transport unit which can be moved at least two-dimensionally in the transport plane, drive coils or movable permanent magnets being arranged on the transport segment and drive magnets being arranged on the transport unit, or vice versa, the drive coils or the movable permanent magnets interacting magnetically with the drive magnets in order to move the transport unit at least two-dimensionally in the transport plane, wherein the transport unit according to claim 1 is designed wherein at least one coupling unit is provided in the transport device, on which unit at least one coupling apparatus for releasably coupling the transport unit to the coupling unit is arranged, wherein the transport unit and the coupling unit can be coupled, at least temporarily, by the coupling apparatuses to form an assembly by way of a relative movement in the transport plane, and wherein the coupling apparatuses interact in the coupled assembly in order to limit a relative movement between the transport unit and the coupling unit in at least one degree of freedom of movement, the at least one coupling unit being a further transport unit and it being possible for the at least two transport units to be coupled by the coupling apparatuses to form a transport unit assembly in which the transport units can be jointly moved in the transport plane, or wherein the at least one coupling unit is an object carrier for receiving an object and the transport unit can be coupled to the object carrier to form an object carrier assembly in which the object carrier can be moved in the transport plane by the transport unit.

9. The transport device according to claim 8, wherein the coupling apparatuses are designed to be form-fitting and/or frictional, and/or wherein the coupling apparatuses each have at least part of a blocking apparatus, the blocking apparatus being designed to limit a relative movement between the transport unit and the coupling unit in the assembly in an additional degree of freedom of movement.

10. The transport device according to claim 9, wherein the blocking apparatus can be actuated by a relative movement between the transport unit and the coupling unit, or wherein an actuating unit for actuating the blocking apparatus is provided in the transport device, the actuating unit preferably being designed as a stationary, in particular mechanical or magnetic, actuating unit, and/or an actuating unit for actuating the blocking apparatus and an actuator for actuating the actuating unit being provided on the transport unit or the coupling unit.

11. The transport device according to claim 8, wherein at least one coupling element is provided in the coupling apparatus of the transport unit and at least one receiving unit is provided in the coupling apparatus of the coupling unit, or vice versa, the coupling element being provided to interact with the receiving unit for releasably coupling the transport unit to the coupling unit, the blocking apparatus preferably having at least one clamping element and at least one clamping opening interacting therewith, the clamping element being arranged on the coupling element and the clamping opening being arranged in the receiving unit, or vice versa.

12. The transport device according to claim 8, wherein the coupling apparatuses each have at least one magnetic element, the magnetic elements being provided to generate a magnetic force of attraction between the transport unit and the coupling unit.

13. A method for operating a transport device according to claim 8, wherein the at least one transport unit is moved in the transport plane relative to the coupling unit, or vice versa, and wherein the transport unit and the coupling unit are coupled to form an assembly by the relative movement by the coupling apparatuses, the blocking apparatus preferably being actuated in the coupled state.

14. The method according to claim 13, wherein a further transport unit is used as the coupling unit, wherein the transport units are coupled to form a transport unit assembly, and wherein the transport unit assembly is moved in the transport plane by at least some of the drive magnets of one of the at least two transport units interacting magnetically with the drive coils or the movable drive magnets of the transport segment or by at least some of the drive coils or the movable drive magnets of one of the at least two transport units interacting magnetically with the drive magnets of the transport segment.

15. The method according to claim 14, wherein the transport unit assembly is moved to a work station where a work process is carried out in which process forces act on the transport unit assembly and/or the transport unit assembly is loaded with at least one object, and wherein the transport unit assembly is decoupled into the at least two transport units after completion of the work process.

\* \* \* \* \*